United States Patent [19]
Johnson et al.

[11] Patent Number: 5,520,880
[45] Date of Patent: May 28, 1996

[54] METHOD FOR FORMING BODIES BY REACTIVE INFILTRATION

[75] Inventors: William B. Johnson, Newark; Eugene S. Park; Gerhard H. Schiroky, both of Hockessin, all of Del.; Danny R. White, Elkton, Md.; Terry D. Claar, Newark, Del.

[73] Assignee: Lanxide Technology Company, LP, Newark, Del.

[21] Appl. No.: 307,649

[22] PCT Filed: Mar. 19, 1993

[86] PCT No.: PCT/US93/02582

§ 371 Date: Sep. 19, 1994

§ 102(e) Date: Sep. 19, 1994

[87] PCT Pub. No.: WO93/18877

PCT Pub. Date: Sep. 30, 1993

Related U.S. Application Data

[63] Continuation-in-part of Ser. No. 854,281, Mar. 20, 1992, abandoned.

[51] Int. Cl.$^6$ ..................................................... B22F 7/00
[52] U.S. Cl. .............................. 419/45; 419/5; 419/10; 419/12; 419/13; 419/14; 419/35
[58] Field of Search .................................. 419/5, 13, 10, 419/12, 14, 35, 45; 501/127, 89, 128; 427/248.1

[56] References Cited

U.S. PATENT DOCUMENTS

| | | | |
|---|---|---|---|
| 3,235,346 | 2/1966 | Hucke | 29/190 |
| 4,824,622 | 4/1989 | Kennedy et al. | 264/59 |
| 4,847,220 | 7/1989 | Lesher et al. | 501/89 |
| 4,885,130 | 12/1989 | Claar et al. | 419/12 |
| 4,885,131 | 12/1989 | Newkirk | 419/12 |
| 4,904,446 | 2/1990 | White et al. | 419/13 |
| 4,923,832 | 5/1990 | Newkirk et al. | 501/128 |
| 5,017,334 | 5/1991 | Claar | 419/12 |
| 5,198,187 | 3/1993 | Lu et al. | 419/35 |
| 5,262,203 | 11/1993 | Lesher et al. | 427/383.5 |
| 5,268,339 | 12/1993 | Aghajanian et al. | 501/127 |
| 5,277,933 | 1/1994 | Claar et al. | 427/248.1 |
| 5,366,686 | 11/1994 | Mortensen et al. | 419/5 |
| 5,420,085 | 5/1995 | Newkirk et al. | 501/98 |
| 5,447,291 | 9/1995 | Sandhage | 264/60 |
| 5,458,480 | 10/1995 | Newkirk et al. | 425/547 |

OTHER PUBLICATIONS

International Search Report for International Patent Application Serial No. PCT/US93/02582.

*Primary Examiner*—Donald P. Walsh
*Assistant Examiner*—John N. Greaves
*Attorney, Agent, or Firm*—Jeffrey R. Ramberg

[57] ABSTRACT

This invention relates to a method for producing a self-supporting body comprising the steps of:

(a) forming a permeable mass comprising at least one solid-phase oxidant selected from the group consisting of the halogens, sulphur and its compounds, metals, metal oxides other than the silicates, and metal nitrides other than those of boron and silicon;

(b) orienting said permeable mass and a source of said parent metal relative to each other so that formation of said oxidation reaction product will occur into said permeable mass;

(c) heating said source of parent metal to a temperature above the melting point of said parent metal but below the melting point of said oxidation reaction product to form a body of molten parent metal;

(d) reacting said body of molten parent metal with said at least one solid-phase oxidant at said temperature to permit said oxidant at said temperature to permit said oxidation reaction product to form; and (e) maintaining at least a portion of said at least one oxidation reaction product in contact with and between said molten parent metal and said solid-phase oxidant at said temperature to progressively draw molten parent metal through said oxidation reaction product towards said solid-phase oxidant to permit fresh oxidation reaction product to continue to form at an interface between said solid-phase oxidant and previously formed oxidation reaction product that has infiltrated said permeable mass.

21 Claims, 12 Drawing Sheets

METHOD FOR FORMING BODIES BY REACTIVE INFILTRATION

This application is a continuation-in-part of Commonly Owned and U.S. patent application Ser. No. 07/854,281, filed Mar. 20, 1992, in the names of William Bayard Johnson et al. and entitled "Method for Forming Ceramic Articles by a Reactive Infiltration Technique and Articles Made Thereby.

TECHNICAL FIELD

This invention relates to a novel method for producing self-supporting composite bodies, formed by the oxidation reaction of a parent metal and a solid-phase oxidant to produce at least one oxidation reaction product comprising, in most cases, at least one intermetallic phase, and, optionally, having at least one metallic component introduced during formation of the body to impart certain properties to the formed body. The invention also relates to formation of, in some cases, ceramic phases in addition to the intermetallic phase(s).

BACKGROUND ART AND COMMONLY OWNED PATENTS AND PATENT APPLICATIONS

In recent years, there has been an increasing interest in the use of ceramics for structural applications historically served by metals. The impetus for this interest has been the superiority of ceramics with respect to certain properties, such as corrosion resistance, hardness, modulus of elasticity, and refractory capabilities, when compared with metals.

Current efforts at producing higher strength, more reliable, and tougher ceramic articles are largely focused upon (1) the development of improved processing methods for monolithic ceramics and (2) the development of new material compositions, notably ceramic matrix composites.

A composite structure is one which comprises a heterogeneous material, body or article made of two or more different materials which are intimately combined in order to attain desired properties of the composite. For example, two different materials may be intimately combined by embedding one in a matrix of the ether. A ceramic matrix composite structure typically comprises a ceramic matrix which incorporates one or more diverse types of filler materials such as particulates, fibers, rods, and the like.

There are several known limitations or difficulties in substituting ceramics for metals, such as scaling versatility, capability to produce complex shapes, satisfying the properties required for the end use application, and costs. Several copending patent applications assigned and issued Patents to the same owner as this application (hereinafter referred to as Commonly Owned Patent Applications and Patents), overcome these limitations or difficulties and provide novel methods for reliably producing ceramic materials, including ceramic composite materials. The method is disclosed generically in Commonly Owned U.S. Pat. No. 4,713,360, entitled "Novel Ceramic Materials and Methods for Making Same", which issued on Dec. 15, 1987, from U.S. patent application Ser. No. 06/818,943, filed Jan. 15, 1986, which was a continuation-in-part of application U.S. Ser. No. 06/776,964, filed Sep. 17, 1985, and now abandoned, which was a continuation-in-part of application Ser. No. 06/705,787, filed Feb. 26, 1985, and now abandoned, which was a continuation-in-part of application Ser. No. 06/591,392, filed Mar. 16, 1984, and now abandoned, all in the names of Marc S. Newkirk et al. This Patent discloses a method of producing self-supporting ceramic bodies grown as the oxidation reaction product of a molten parent precursor metal which is reacted with a vapor-phase oxidant to form an oxidation reaction product. Molten metal migrates through the formed oxidation reaction product to react with the oxidant, thereby continuously developing a ceramic polycrystalline body which can, if desired, include an interconnected metallic component. The process may be enhanced by the use of one or more dopants alloyed with the parent metal. For example, in the case of oxidizing aluminum in air, it is desirable to alloy magnesium and silicon with the aluminum to produce alpha-alumina ceramic structures. This method was improved upon by the application of dopant materials to the surface of the precursor metal, as described in Commonly Owned U.S. Pat. No. 4,853,352, entitled "Methods of Making Self-Supporting Ceramic Materials and Materials Made Thereby", which issued on Aug. 1, 1989, from U.S. patent application Ser. No. 07/220,935, which was a Rule 62 continuation of commonly owned U.S. patent application Ser. No. 06/822,999, filed Jan. 27, 1986, and now abandoned which was a continuation-in-part of Ser. No. 06/776,965, filed Sep. 17, 1985, and now abandoned, which was a continuation-in-part of Ser. No. 06/747,788, filed Jun. 25, 1985, and now abandoned, which was a continuation-in-part of U.S. Ser. No. 06/632,636, filed Jul. 20, 1984, and now abandoned, all in the names of Marc S. Newkirk et al.

This oxidation phenomenon was utilized in producing ceramic composite bodies as described in Commonly Owned U.S. Pat. No, 4,851,375, entitled "Methods of Making Composite Ceramic Articles Having Embedded Filler", which issued on Jul. 25, 1989, from U.S. patent application Ser. No. 06/819,397, filed Jan. 17, 1986, which was a continuation-in-part of U.S. Ser. No. 06/697,876, filed Feb. 4, 1985, and now abandoned, all in the names of Marc S. Newkirk et al. and entitled "Composite Ceramic Articles and Methods of Making Same". These patent applications and patents disclose novel methods for producing a self-supporting ceramic composite by growing an oxidation reaction product from a parent metal into a permeable mass of filler, thereby infiltrating the filler with a ceramic matrix. The resulting composite, however, has no defined or predetermined geometry, shape, or configuration.

A method for producing ceramic composite bodies having a predetermined geometry or shape is disclosed in Commonly Owned and Copending U.S. Pat. No. 5,017,526, entitled "Method of Making Shaped Ceramic Composite", which issued on May 21, 1992, from U.S. patent application Ser. No. 07/338,741, filed Apr. 14, 1989, as a Rule 62 Continuation of U.S. patent application Ser. No. 06/861,025, filed May 8, 1986, and now abandoned, in the names of Marc S. Newkirk et al. and entitled "Shaped Ceramic Composites and Methods of Making the Same". In accordance with the method in U.S. Pat. No. 5,017,526, the developing oxidation reaction product infiltrates a permeable preform of filler material in the direction towards a defined surface boundary.

It was discovered that high dimensional fidelity is more readily achieved by providing the preform with a barrier means, as disclosed in Commonly Owned U.S. Pat. No. 4,923,832, which issued on May 8, 1990, from U.S. patent application Ser. No. 06/861,024, filed May 8, 1986, in the names of Marc S. Newkirk et al. and entitled "Method of Making Shaped Ceramic Composites with the use of a Barrier". This method produces shaped self-supporting ceramic bodies, including shaped ceramic composite bodies by growing the oxidation reaction product of a precursor metal to a barrier means spaced from the metal for establishing a boundary or surface.

Ceramic composite bodies having a cavity with an interior geometry inversely replicating the shape of a positive parent metal mold or pattern are disclosed in Commonly Owned U.S. Pat. No. 4,828,785, entitled "Inverse Shape Replication Method of Making Ceramic Composite Articles", which issued on May 9, 1989, from U.S. patent application Ser. No. 06/823,542, filed Jan. 27, 1986, in the names of Marc S. Newkirk, et al. and entitled "Inverse Shape Replication Method of Making Ceramic Composite Articles and Articles Obtained Thereby", and in Commonly Owned U.S. Patent No. 4,859,640, which issued on Aug. 22, 1989, from U.S. patent application Ser. No. 06/896,157, filed Aug. 13, 1986, in the name of Marc S. Newkirk and entitled "Method of Making Ceramic Composite Articles with Shape Replicated Surfaces and Articles Obtained Thereby".

The above-discussed Commonly Owned Patent Applications and Patents disclose methods for producing ceramic and/or ceramic composite articles which overcome some of the traditional limitations or difficulties in producing ceramic articles as substitutes for traditional ceramics and metals in various end-use applications.

Common to each of these Commonly Owned Patent Applications and Patents is the disclosure of embodiments of a ceramic body comprising an oxidation reaction product interconnected in one or more dimensions (usually in three dimensions) and, if desired, a metallic component comprising one or more metallic constituents. The volume of metal, which typically includes non-oxidized constituents of the parent metal and/or metal which has been donated by (e.g., reduced from), for example, an oxidant, a filler or some constituent added to a filler, depends on such factors as the temperature at which the oxidation reaction product is formed, the length of time during which the oxidation reaction is allowed to proceed, the composition of the parent metal, the presence of dopant materials, the presence of reduced constituents from any source, etc. Some of the metallic constituents can be isolated or enclosed, but also a substantial volume percent of metal can be interconnected and accessible, or rendered accessible, from an external surface of the ceramic body. It has been observed for these ceramic bodies that this metal-containing component (both isolated and interconnected) can range from about 1 to about 40 percent by volume, and sometimes higher, if desired. The metallic component can impart certain favorable properties to, or improve the performance of, the ceramic articles in many product applications. For example, the presence of metal in the ceramic structure may have a substantial benefit with respect to imparting fracture toughness, thermal conductivity, or electrical conductivity to the ceramic body.

The entire disclosures of all of the foregoing Commonly Owned Patent Applications and Patents are expressly incorporated herein by reference.

DEFINITIONS

As used herein in the specification and the appended claims, the terms below are defined as follow:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body contains minor or substantial amounts of a metallic component comprising one or more metallic constituents (isolated and/or interconnected), most typically within a range of from about 1–40% by volume, but may include still more metal.

"Oxidation reaction product" means one or more metals in any oxidized state wherein the metal(s) has given up electrons to or shared electrons with another element, compound, or combination thereof. Accordingly, an "oxidation reaction product" under this definition includes the product of reaction of one or more constituents of the parent metal with one or more materials containing one or more solid-phase oxidants, including, for example, the halogens, sulphur and its compounds, oxides, carbides, borides and nitrides. Moreover, the solid-phase oxidant may contain metals such as arsenic selenium, tellurium, molybdenum, niobium, silicon and titanium. Accordingly, this definition includes intermetallic compounds, alloys, solid solutions or the like formed between any constituents of the parent metal and a second or foreign metal which may be initially present as, for example, at least one component of the one or more solid-phase oxidants.

"Parent metal" refers to the metal which reacts with the solid-phase oxidant to form the oxidation reaction product, and includes that metal as a relatively pure metal or a commercially available metal with impurities; and when a specified metal is mentioned as the parent metal, e.g. aluminum, silicon, titanium, zirconium, hafnium, tin, zinc, etc., the metal identified should be read with this definition in mind unless indicate otherwise by the context.

"Second or foreign metal" means any suitable metal, combination of metals, alloys, intermetallic compounds, or sources of either, which is, or is desired to be, incorporated as a metallic constituent or phase into the metallic component of a formed ceramic body in lieu of, in addition to, or in combination with unoxidized constituents of the parent metal. This definition includes intermetallic compounds, alloys, solid solutions or the like formed between two or more such second or foreign metals, one or more of which may be initially present as, for example, at least one component of the one or more solid-phase oxidants.

"Flux" of molten metal means the flow or transport of molten metal within the oxidation reaction product, induced by the process conditions. "Flux" as used herein is not meant to define a substance as used in reference to classical metallurgy.

"Parent metal carcass" refers to any remaining parent metal which has not been consumed during formation of the self-supporting body, and typically, which remains in at least partial contact with the formed body. It should be understood that the carcass may also typically include some oxidized constituents of the parent metal and/or a second or foreign metal therein.

SUMMARY OF THE INVENTION

In accordance with a first embodiment of the present invention, there is provided a method for producing a self-supporting body comprising at least one intermetallic compound body by the oxidation of a parent metal, wherein said body comprises the oxidation reaction product of a molten parent metal with a solid-phase oxidant, and a metallic component. Further, a second or foreign metal may be introduced or incorporated into the metallic component of the self-supporting body during the formation of the body in a quantity sufficient to affect, at least partially, one or more properties of the body.

Generally, in the method for producing a self-supporting body comprising an intermetallic compound formed by the oxidation of a parent metal, the parent metal is heated to form a body of molten parent metal and is placed into contact with a solid-phase oxidant. The molten parent metal reacts with the oxidant, at a suitable temperature, to form at least one intermetallic oxidation reaction product, which product is maintained at least partially in contact with, and extends between, the body of molten parent metal and the solid-phase oxidant. At this temperature, molten parent metal is transported continuously through the intermetallic oxidation reaction product towards the solid-phase oxidant to continue the reaction. Furthermore, during the process, at least one second or foreign metal also may be incorporated into the flux of molten metal (described below in detail) and thence into the resulting metallic component of the formed body. The resulting metallic component, comprising molten parent metal and at least one second or foreign metal, is transported through the intermetallic oxidation reaction product, and the parent metal oxidizes as it contacts the solid-phase oxidant, thereby continuously developing a self-supporting body. The oxidation reaction is continued for a time sufficient to form a self-supporting body comprising an intermetallic oxidation reaction product and a metallic component. The metallic component may comprise nonoxidized constituents of the parent metal and at least one second or foreign metal which may be present in a significant quantity such that one or more properties of the body are at least partially affected by the presence and/or properties of the second or foreign metal. By reason of the process of this invention, the self-supporting body exhibits one or more predetermined or desired properties.

In accordance with the present invention, the second or foreign metal may be introduced into the flux of molten metal during the formation of the self-supporting body, and is transported with molten parent metal as a flux of molten metal through the intermetallic oxidation reaction product. A portion of the parent metal reacts with the solid-phase oxidant to form the intermetallic oxidation reaction product while the second or foreign metal may remain substantially unoxidized by the solid-phase oxidant, and typically, is dispersed throughout the metallic component. In one embodiment of the present invention, the second or foreign metal forms as a result of the reaction between the parent metal and the solid-phase oxidant. Specifically, the oxidation of the parent metal may reduce the solid-phase oxidant to a metallic phase, the metallic phase comprising the second or foreign metal. In a different embodiment of the present invention, the second or foreign metal is provided in elemental (e.g., metallic) form. In this particular embodiment, the second or foreign metal may be applied as a layer on the surface of the parent metal or solid-phase oxidant, or the second or foreign metal may be admixed with the solid-phase oxidant. Regardless of the particular embodiment used, upon formation of the self-supporting body, the second or foreign metal, as a constituent of the metallic component, is an integral part of the formed body, thereby altering or improving one or more properties of the body.

In another embodiment, wherein a composite is formed and the oxidation reaction product is grown into a mass of filler material or a shaped preform, the second metal may be provided by admixing the solid-phase oxidant, homogeneously or non-homogeneously, with the filler material or preform. As the intermetallic oxidation reaction product forms in the porosity present in the filler material, and the molten metal is transported through the developing intermetallic oxidation reaction product, the molten parent metal contacts the second or foreign metal. After such contact, the second metal, or some portion thereof, may be introduced or incorporated into the flux of molten metal and can be transported into the matrix. The parent metal, or a portion thereof, continues to be oxidized by the solid-phase oxidant at the interface between the solid-phase oxidant and previously formed oxidation reaction product, while the second metal may be transported in the flux within the formed composite.

In still another embodiment, the second or foreign metal can be provided in the form of an additional compound or mixture (i.e., a compound or mixture having a composition which is different from the solid oxidant) which at least partially reacts with the molten metal, and/or dissociates under process conditions, to liberate the second metal which can then be introduced or incorporated into the flux of molten metal. Such additional compound or mixture may be applied, for example, as a layer on top of the parent metal body, or admixed with or applied to a filler material or preform.

DETAILED DESCRIPTION OF THE INVENTION AND PREFERRED EMBODIMENTS

Figure 1:
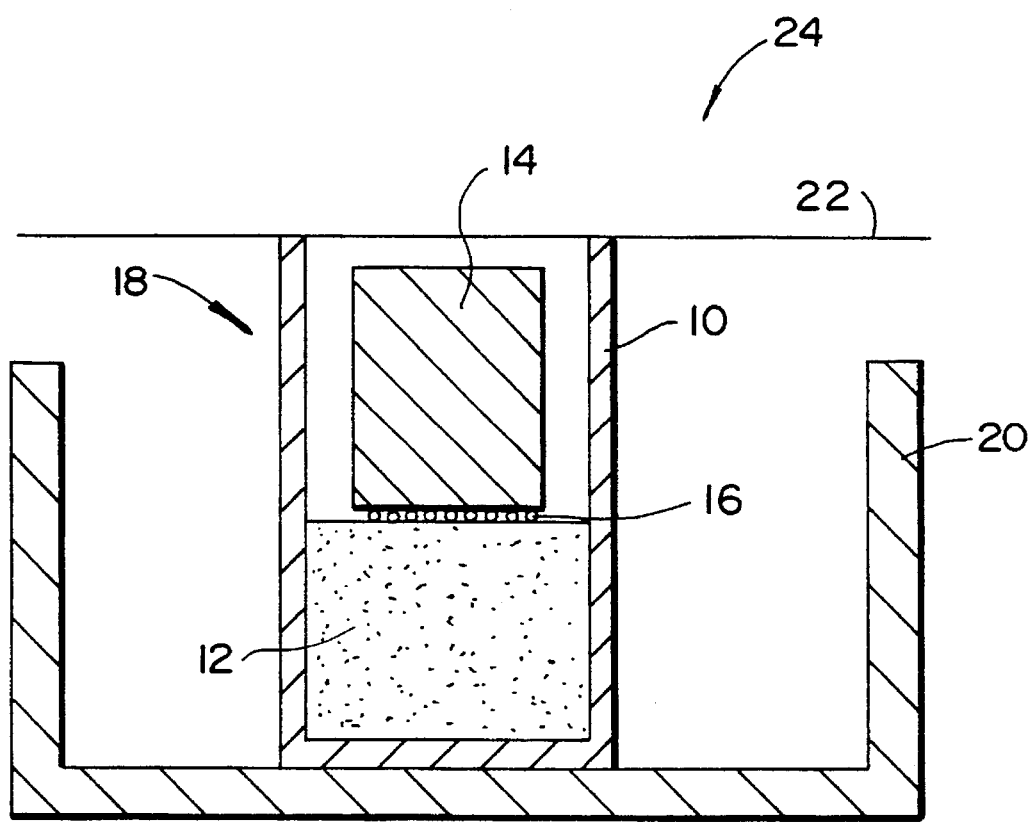
FIG. 1 is a cross-sectional schematic view of the setup used in carrying out the composite fabrication process of Example 1.

In accordance with the present invention, the parent metal, which may contain a dopant (as explained below in greater detail), is formed into an ingot, billet, rod, plate, or the like; and is placed into an appropriate setup, comprising, for example, an inert bed, crucible or other refractory container. It has been discovered that a second or foreign metal can be combined with molten parent metal during formation of the self-supporting body, either containing or not containing a filler, to form a flux of metal. The resulting parent metal and second metal flux may be transported through the previously formed oxidation reaction product by, for example, capillary transport of the flux of molten metal, in a manner similar to that manner described in the Commonly Owned Patents and Patent Applications. Thus, the second or foreign metal may become an integral part of the metallic component of the formed body.

A predetermined quantity of a solid-phase oxidant can be provided to the setup comprising the parent metal, said inert bed, crucible or other refractory container, and optionally a composite filler material or preform. Specifically, by placing the solid-phase oxidant into contact with one or more surfaces of the parent metal or, in cases where a composite is formed, by admixing the solid-phase oxidant with the filler material or preform and heating the parent metal to form molten parent metal, reaction between the parent metal and the solid-phase oxidant can occur (which techniques are discussed in greater detail below). The body is then recovered, said body having a metallic component comprising unoxidized constituents of the parent and, if desired, the second metal. Moreover, the metallic component of the formed body comprises interconnected and/or isolated metallic inclusions.

In the practice of the present invention, the choice of the solid-phase oxidant(s) and parent metal(s) are based primarily upon one or more properties desired for the body to be formed. The metallic component can impart certain favorable properties to, or improve the performance of, the formed body with respect to its intended use. For example, a metallic component in the body can beneficially improve the fracture toughness, thermal conductivity, environmental compatibility, and electrical conductivity of the body, depending upon such factors as the composition of the metallic component and the amount and distribution of the metallic component throughout the formed body. By providing a method for tailoring the constituents of the metallic component to include metals or metallic phases in addition to or other than the parent metal, the invention adds substantial latitude to the end-use applications for such formed bodies. In order to impart the desired property(ies) to the formed body, second or additional metals should be chosen which do not form an oxidation reaction product preferentially to the parent metal under the particular process conditions utilized. Typically, a second metal satisfies that criterion if its oxidation reaction product has a less negative free energy of formation at a given reaction temperature than that of the parent metal, with respect to the particular oxidation reaction occurring with the solid-phase oxidant present.

The second or foreign metal may alloy or react with the parent metal within the metallic component when such second or foreign metal has a chemical composition which is different from the composition of the parent metal. Additionally, the second or foreign metal may react with one or more components of the solid-phase oxidant to form, for example, alloys or additional intermetallic compounds, which may be desirable, or impart desirable attributes to the resulting body. Thus, in accordance with the present invention, there is also provided a method for the in situ formation of one or more desired metallic phases comprising one or more of the metallic constituents of the parent metal, one or more second or additional metals and one or more components of the solid-phase oxidant (e.g., a product or products of the reaction with the solid-phase oxidant). Such metallic phases include intermetallic compounds, solid solutions, alloys or combinations of each. In the present embodiment, a suitable solid-phase oxidant is chosen such that the resultant body includes at least one at least one desirable oxidation reaction product and desirable metallic phase. For example, a solid-phase oxidant may be chosen such that a second metal forms one or more metallic phases in combination with the parent metal, at a given temperature aria relative concentration, which are desirable to be incorporated into, for example, the metallic component of the formed body. The second or additional metal may be provided and introduced into the flux of molten metal in a lower relative concentration than is needed to form the desired metallic phase or phases in the resultant body. As the molten parent metal reacts with the solid-phase oxidant at a given reaction temperature, thus forming at least one oxidation reaction product, the relative concentration of parent metal within the interconnected metallic component (i.e., flux) is depleted or reduced. Therefore, the relative concentration of the second metal increases within the metallic component of the formed body. The reaction is continued at a given reaction temperature or within a temperature range until a sufficient quantity of parent metal has been depleted from the molten metal flux leading to the formation of one or more desired metallic phase(s), comprising, in some cases, the parent metal and second metal. Alternatively, the oxidation reaction can be continued for a time sufficient to deplete an amount of parent metal such that, upon reducing the reaction temperature, or cooling the formed body, the desired metallic component formation occurs, thus forming or enriching the desired metallic phase comprising, in some cases, the parent metal and second metal. The resulting metallic phase or phases can either inherently impart a desirable property or properties to the body, or can be of such a composition that will form one or more additional phases at a given service temperature, thereby imparting the desired property or properties to the formed body. Additionally, by the manipulation of reaction parameters (e.g. reaction time, reaction temperature, etc.) or by the appropriate combination or addition of certain metals, the metallic component of a formed body can be further tailored as in, for example, precipitation hardening of a desired alloy within the metallic component.

Since the method herein disclosed of optionally incorporating a second or foreign metal into the metallic component of a formed body involves the intimate combination of two or more metals, viz. the second metal and parent metal, it should be understood that the latitude afforded with respect to the identity, quantity, form, and/or concentration of second metal relative to the parent metal to be employed will depend upon the metallic constituents or phases which are desired to be incorporated into the body, and the process conditions necessary for the formation of the desired oxidation reaction product(s). The inclusion and/or formation of the desired metallic constituents will be governed, at least in part, by the properties and/or physical metallurgy associated with the combination or interaction of the particular metals present under the particular process conditions, and/or the solid-phase oxidant chosen for reaction with the parent metal. This combination of metals may effect the formation of various metallic phases, including alloys, intermetallic compounds, solid solutions (including relatively pure elements), precipitates, or mixtures thereof, and may be affected by the presence and concentration of impurities and/or dopant materials. Thus, the metallic component resulting from combination of the metals in the practice of the present invention can have properties which vary significantly from those of the several metals individually. Such combinations comprising the parent metal and second metal incorporated into the metallic component of the formed ceramic body can advantageously affect properties of the formed body. For example, the combination of second metal and parent metal may form one or more metallic phases such as solid solutions, alloys or one or more additional intermetallic compounds which have a melting point above that of the parent metal, thereby expanding the service temperature range of a ceramic body having such (a) metallic phase(s) incorporated therein as (a) metallic constituent(s) of the metallic component of the body. Moreover, it should be understood that in some cases the melting point of the resulting metallic constituent(s) may be above the operable temperature range for the formation of the intended oxidation reaction product. Additionally, the formation of metallic constituents resulting from certain combinations of parent and second metals may impart added viscosity to the resulting molten metal at the reaction temperature, as compared with molten parent metal without the addition of second metal at the same temperature, such that the transport of molten metal through the formed oxidation reaction product substantially slows or does not occur. As such, care should be taken with respect to designing a desired system which includes such a combination of parent and second metals in order to ensure that the metallic component remains sufficiently liquid while the oxidation reaction product is being formed to facilitate the continued flux of molten metal at a temperature which is compatible with the parameters of the oxidation reaction process.

Additional factors to be considered when selecting an appropriate solid-phase oxidant material include the metallurgical properties associated with the contact of the molten parent metal with the second metal in order to effect introduction of the desired quantity of second metal into the flux of the metallic component. For example, when a solid-phase oxidant is reduced by the parent metal to liberate a second metal into the metallic component, interdiffusion of the two metals, or reaction of the two metals as in the formation of one or more additional intermetallic compounds, ceramic compounds or other metallic phases between the parent metal and second metal may occur. Thus, the introduction and/or rate of introduction of second metal into the flux of the metallic component will depend on one or more of several such metallurgical factors. Such factors include the physical state of the second metal at the particular reaction temperature, the rate of interdiffusion between the parent metal and second metal, the degree and/or rate of solubility of the second metal into the parent metal or the parent metal into the second metal, and the formation of additional intermetallics or other metallic phases between the parent metal and second metal. Thus, care should be taken to ensure that the reaction temperature is maintained such that the metallic constituents, resulting from the introduction of second metal into the flux of the metallic component of the formed body, remain at least partially liquid to facilitate the transport of the metallic constituents through the metallic component into the formed oxidation reaction product, and thus enable contact of the molten parent metal with the solid-phase oxidant in order to facilitate formation of the body. In accordance with the present invention, the introduction of a second metal into the flux of molten metal, or the depletion of parent metal from the flux of molten metal due to formation of the oxidation reaction product, can result in the formation of one or more metallic phases comprising the parent metal and second metal. However, metallic phases comprising certain combinations of parent metal and second metal may impart significant viscosity to the metallic component of the forming body, or otherwise impede the flux of the molten metal fraction of the metallic component such that transport of metal toward the solid-phase oxidant ceases prior to the complete development of the desired oxidation reaction product. In such cases, the formation of the desired oxidation reaction product may be halted or substantially slowed by those phenomena and, therefore, care should be exercised to avoid the premature or excessive formation of such metallic phases.

Numerous types of reactions and the composite materials produced thereby should be readily apparent to those of ordinary skill in the art. Some of these examples, under the appropriate reaction conditions, may include those material combinations set forth in Table I. However,

TABLE I

| Possible Reaction Combinations | | | | |
|---|---|---|---|---|
| Parent Metal | Solid-Phase Oxidant | Atm. | Second or Foreign Metal | Oxidation Reaction Product Matrix |
| 1. Ti | $Si_3N_4$ | Ar | $Ti_5Si_3$ | TiN |
| 2. Al | $NbO_2$ | Ar | $NbAl_3$ | $Al_2O_3$ |
| 3. Ti | $SiB_6$ | Ar | $MoSi_2$ | $TiB_2$ |
| 4. Nb/Al | $NbO_2$ | Ar | $NbAl_3/NbAl_2$ | $Al_2O_3$ | specific working examples of the invention are set forth in the Examples later herein.

In certain embodiments of the invention, where the product is a composite fabricated by growing the oxidation reaction product into a mass or aggregate of filler material or a permeable preform, which filler material or preform may be placed adjacent to the parent metal, the solid-oxidant material may be provided by admixing it with the filler material or preform material, or applied, as in layering, to one or more surfaces of the filler material or preform. The solid-phase oxidant may also be applied on only one or more surfaces of a mass or aggregate of filler material or shaped preform. Application of a solid-phase oxidant to one or more surfaces of a mass of filler material or preform in accordance with the present embodiment can result in a composite body wherein the exposed portions of the metallic component are rich in the second or foreign metal from the solid-phase oxidant relative to other portions of the metallic component within the formed composite body.

The solid-phase oxidant can be provided in the form of a mixture or compound which will react with the molten parent metal, and/or dissociate under the process conditions, to liberate the second or foreign metal therefrom, which is then introduced, as discussed above, into the flux of molten metal. Such a compound may be a metal oxide, nitride, carbide, boride, etc., which is reducible by, or will react with, the parent metal to liberate the second metal(s). For example, if a composite body is desired comprising a ceramic matrix, fabricated by the oxidation of an aluminum parent metal, to embed particles of an alumina filler material, a solid-phase oxidant (e.g., a single, binary, ternary or higher order oxide, nitride, carbide, boride, etc.) containing desired second metal(s) such as silicon, nickel, iron, or chromium may be admixed with the alumina filler material, or layered on top of the aluminum parent metal. For example, if chromium is desired as a second metal, chromium metal can be introduced into the flux of molten metal by admixing chromium oxide with a filler material. When the flux of the molten aluminum contacts the chromium oxide, some of the molten aluminum will reduce the chromium oxide and liberate chromium metal. A quantity of the liberated chromium metal is then introduced into the flux of the remaining molten aluminum, as discussed above, and transported through and/or into the oxidation reaction product which is formed as the molten aluminum parent metal continues to contact the chromium oxide solid-phase oxidant.

As explained in the Commonly Owned Patents and Patent Applications, dopant materials, used in conjunction with the metal, favorably influence the oxidation reaction process. Additionally, in the practice of the present invention, in certain cases a dopant material may be chosen to, in addition to its doping qualities, provide a second or foreign metal or a source of the same which is desirable to be incorporated into the metallic component of the formed body. However, in some cases, a suitable dopant material will not be available which supplies the necessary doping characteristics and a source of the desired second or foreign metal and/or solid-phase oxidant. Therefore, a dopant material may need to be used in conjunction with the second or foreign metal and/or solid-phase oxidant. It should be noted, however, that when employing a dopant material in conjunction with a solid-phase oxidant, the presence of each may have an effect upon the function and/or performance of the other. Thus, in practicing certain embodiments of the present invention, where it is desirable to effect the formation of one or more metallic constituents comprising the parent metal and second metal, and, additionally, where a separate dopant material is employed, the respective concentrations of parent metal and solid-phase oxidant necessary to effect formation of the desired constituent(s) may be different than the concentrations necessary to effect formation of the metallic constituents in the binary system comprising the parent metal and solid-phase oxidant. Therefore, care should be taken to consider the effect of all materials present in a specific case when designing a system wherein it is desired to effect the formation of one or more metallic constituents within the metallic component of the formed body. The dopant or dopants used in conjunction with the parent metal, as in the case of second metals, (1) may be provided as alloying constituents of the parent metal, (2) may be applied to at least a portion of the surface of the parent metal, or (3) may be applied to or incorporated into part or all of the filler material or preform, or any combination of two or more of techniques (1), (2), or (3) may be employed. For example, an alloyed dopant may be used alone or in combination with a second externally applied dopant. In the case of technique (3), wherein additional dopant or dopants are applied to the filler material, the application may be accomplished in any suitable manner as explained in the Commonly Owned Patents and Patent Applications.

The function or functions of a particular dopant material can depend upon a number of factors. Such factors include, for example, the particular combination of dopants when two or more dopants are used, the use of an externally applied dopant in combination with a dopant alloyed with the parent metal, the concentration of dopant employed, the oxidizing environment, process conditions, and as stated above, the identity and concentration of the second metal present.

As disclosed in the above-discussed U.S. Pat. No. 4,923,832, a barrier means may be used to inhibit growth or development of the oxidation reaction product beyond the barrier. Suitable barrier means may be any material, compound, element, composition, or the like, which, under the process conditions of this invention, maintains some integrity, is not volatile, and is capable of locally inhibiting, poisoning, stopping, interfering with, preventing, or the like, continued growth of oxidation reaction product. Suitable barriers include calcium sulfate (Plaster of Paris), calcium silicate, and Portland cement, and combinations thereof, which typically are applied as a slurry or paste to the surface of the filler material. Still further, the barrier means may include a suitable refractory particulate to reduce any possible shrinkage or cracking which otherwise may occur during the process. Such a particulate having substantially the same coefficient of expansion as that of the filler material is especially desirable.

This invention is further illustrated in the following non-limiting Example.

EXAMPLE 1

This Example demonstrates the fabrication of a composite body comprising a niobium aluminide ($NbAl_3$) intermetallic. FIG. 1 is a cross-sectional schematic view of the setup used in carrying out the composite fabrication process. This Example should not be construed as being limited to the above-described embodiment, however, but instead as also disclosing other important aspects of the claimed invention.

About 6.94 grams of titanium diboride particulate having substantially all particles smaller than about 45 μm in diameter (−325 mesh, Consolidated Astronautics Co., Saddle Brook, N.J.) and about 13.1 grams of niobium particulate having substantially all particles smaller than about 45 microns in diameter (−325 mesh, Consolidated Astronautics Co.) were hand mixed in a weighing dish. The particulate mixture was then poured into a Grade ATJ graphite crucible 10 (Union Carbide Corp., Carbon Products Division, Cleveland, Ohio) measuring about 1.5 inches (37 mm) in interior diameter by about 2.5 inches (64 mm) high and hand tapped to collapse any excessive porosity between the particles, thereby forming a permeable mass 12. About 0.34 grams of magnesium particulate 16 having substantially all particles between about 300 and about 700 microns in diameter (−24+50 mesh, Hart Corp., Tamaqua, Pa.) was sprinkled evenly over the leveled permeable mass 12 of niobium and titanium diboride. A parent metal ingot 14 weighing about 25.4 grams and comprising commercially pure aluminum was then placed on top of the layer of magnesium particulate 16 to form a lay-up 18. The graphite crucible 10 and its contents were then placed into a graphite containment boat 20 measuring about 5 inches (127 mm) square by about 2 inches (51 mm) in height and covered with a GRAFOIL® graphite foil sheet 22.(Union Carbide Co., Carbon Products Div., Cleveland, Ohio) to complete the experimental setup 24.

The setup 24 comprising the graphite containment boat 20 and its contents was then placed into the vacuum chamber of a vacuum furnace at about 25° C. The chamber was then sealed, and twice evacuated to less than about 4×10−4 torr and backfilled to substantially atmospheric pressure with commercially pure argon gas. An argon gas flow rate of about 4000 sccm was thereafter established and maintained at a pressure above atmospheric pressure of about 5 psi (35,000 Pa). The temperature inside the furnace chamber was then increased from about 25° C. to a temperature of about 1000° C. at a rate of about 200° C. per hour. After maintaining a temperature of about 1000° C. for about 10 hours, the temperature in the chamber was then decreased back to about 25° C. at a rate of about 200° C. per hour.

When the temperature in the vacuum chamber had cooled to substantially ambient temperature (e.g., about 25° C.), the pressure in the chamber was equilibrated with the ambient atmospheric pressure, the chamber was opened and the setup 24 was recovered and disassembled to reveal that a composite body had formed.

A portion of the formed composite material was analyzed qualitatively by x-ray diffraction. This sample was prepared by chipping off some of the formed composite material and grinding it to a fine powder in a mortar and pestle. The powdered sample was placed into the sample chamber of an x-ray diffractometer (Model D500, Siemens AG, Munich, Germany) and scanned with unfiltered $Cu_{K\alpha}$ x-radiation at an energy of about 40 KeV. The counting time was about two seconds at each 0.030 degree interval of two-theta. This x-ray diffraction analysis revealed the presence of $NbAl_3$, Al and $TiB_2$.

Figure 2A:
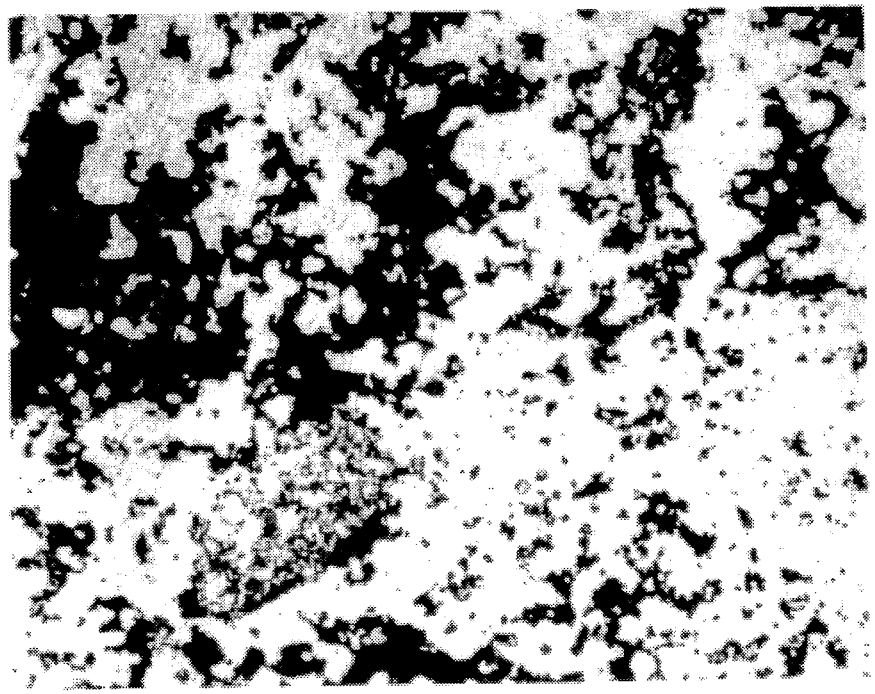
FIGS. 2A and 2B are optical photomicrographs taken at about 53× and about 425× magnifications, respectively, of a polished cross-section of the formed composite material of Example 1.
Figure 2B:
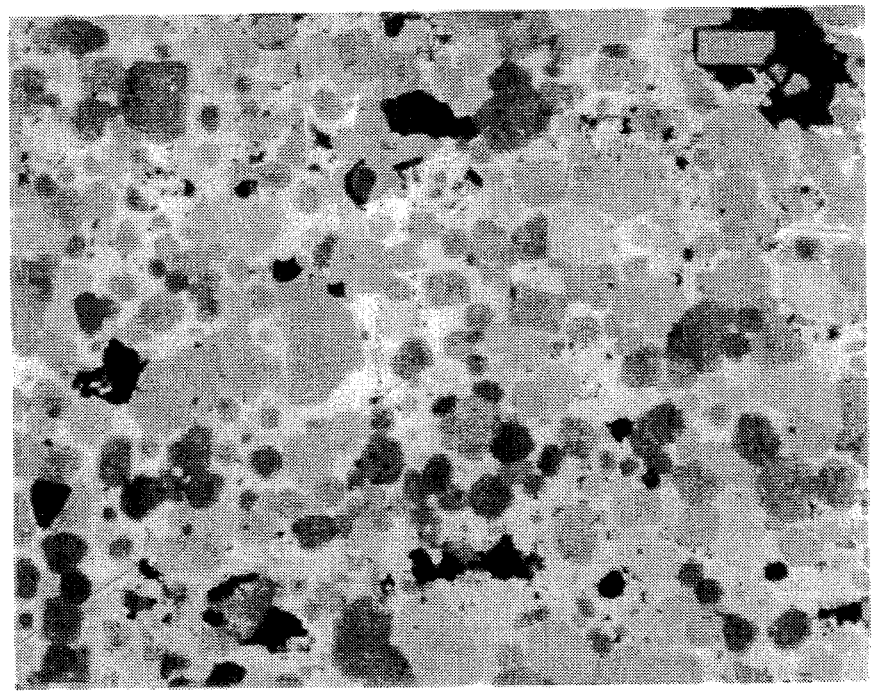

Another portion of the composite body was sectioned with a diamond saw, mounted in plastic and polished with progressively finer grades of diamond polishing compound in preparation for microscopic examination. FIGS. 2A and 2B are optical photomicrographs taken at about 53× and 425× magnification, respectively, of such a polished cross-section.

Thus, this Example demonstrates that a composite body comprising a niobium aluminide intermetallic oxidation reaction product can be formed by reactively infiltrating a parent metal comprising aluminum into a permeable mass comprising niobium.

EXAMPLE 2

This Example demonstrates the fabrication of a composite body comprising an oxidation reaction product comprising a titanium aluminide intermetallic. The setup used to fabricate this composite material was substantially the same as than shown in FIG. 1. This Example should not be construed as being limited to the above-described embodiment, however, but instead as also disclosing other important aspects of the claimed invention.

About 20 grams of titanium particulate having substantially all particles smaller than about 45 µm in diameter −325 mesh, Consolidated Astronautics Co., Saddle Brook, N.J. and about 20.1 grams of titanium diboride having substantially all particles between about 1 and 5 µm in diameter Atlantic Equipment Engineers, Bergenfield, N.J.) were hand mixed together in a weighing dish to a uniform color. The particulate admixture was then poured into a Grade ATJ graphite crucible 10 (Union Carbide Co., Carbon Products Division, Cleveland, Ohio) having an inside diameter of about 1 inch (25 mm) and a height of about 2.5 inches 64 mm) and leveled. The graphite crucible 10 and its contents were then hand tapped to collapse any excessive void space between the particles, thereby forming the particulate admixture into a permeable mass 12. About 0.2 grams of magnesium particulate 16 having substantially all particles between about 300 and 700 µm in diameter (−24+50 mesh, Hart Corp. Tamaqua, Pa.) was then sprinkled on Tamaqua, Pa.) was then sprinkled on top of the particulate admixture in the graphite crucible 10. An ingot of parent metal 14 weighing about 35.5 grams and comprising commercially pure aluminum was then placed into the graphite crucible 10 on top of the magnesium particulate layer 16 to form a lay-up 18. The graphite crucible 10 and its contents was then placed into a graphite containment boat 20 measuring about 3 inches (76 mm) square by about 3.25 inches (83 mm) in height. The opening at the top of the boat was covered with a GRAFOIL® graphite foil sheet 22 in substantially the same manner as was described in Example 1 to form a setup 24.

The setup 24 comprising the graphite containment boat 20 and its contents was then placed into the vacuum chamber of a vacuum furnace. The chamber was sealed, and then twice evacuated and backfilled with argon gas in substantially the same manner as was described in Example 1 . A commercially pure argon gas flow rate of about 4000 to 5000 sccm was then established and maintained through the vacuum chamber at a pressure above atmospheric pressure of about 5 psi (35,000 Pa). The temperature inside the vacuum chamber was then increased from a temperature of about 25° C. to a temperature of about 800° C. at a rate of about 200° C. per hour. After maintaining a temperature of about 800° C. for about 10 hours, the furnace chamber and its contents were then cooled to about 25° C. at a rate of about 200° C. per hour.

After the temperature inside the vacuum chamber had cooled to about 25° C., the pressure in the vacuum chamber was equilibrated with the ambient atmospheric pressure, the chamber was opened and the setup 24 comprising the graphite containment boat 20 and its contents was recovered and disassembled in substantially the same manner as in Example 1 to reveal that a composite body had formed. This composite body was recovered from the lay-up 18.

Figure 3:
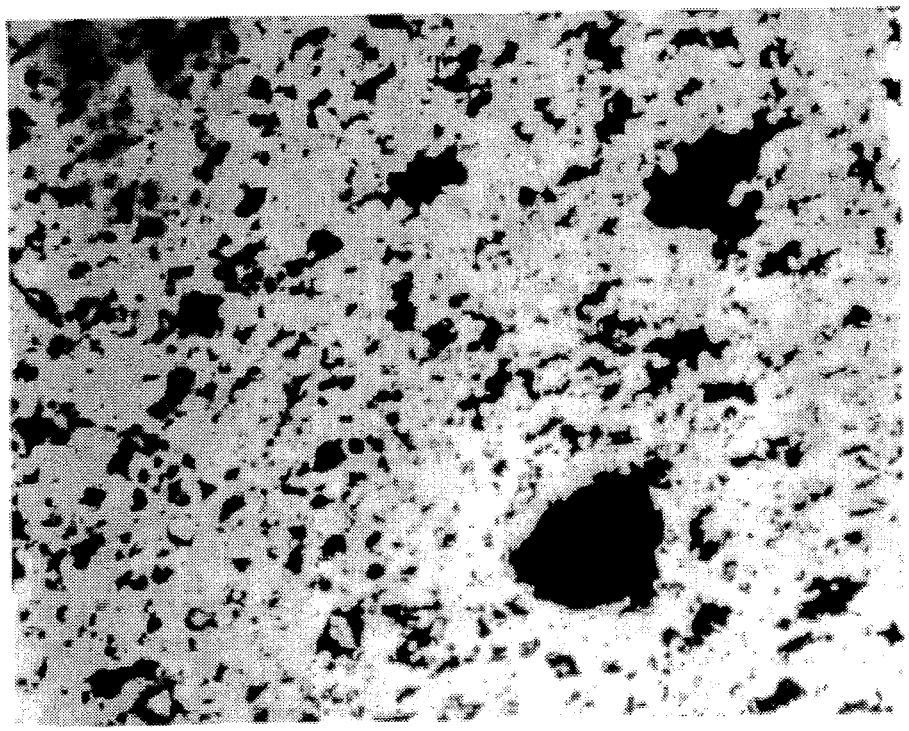
FIG. 3 is an optical photomicrograph taken at about 53× magnification of a polished cross-section of the formed composite material of Example 2.

The composite body was sectioned with a diamond saw, mounted in plastic and polished with progressively finer grades of diamond polishing compound in preparation for microscopic examination. FIG. 3 is an optical photomicrograph taken at about 53× magnification of this polished cross-section.

Subsequent qualitative x-ray diffraction analysis of the composite body performed in substantially the same manner as described in Example 1 revealed the presence of $TiAl_3$, $TiB_2$ and possibly a trace of $TiO_2$ as anatase.

Thus, this Example demonstrates that a composite body comprising $TiAl_3$ titanium aluminide intermetallic oxidation reaction product can be produced by the reactive infiltration of a parent metal comprising aluminum with a permeable mass comprising titanium.

EXAMPLE 3

Figure 4:
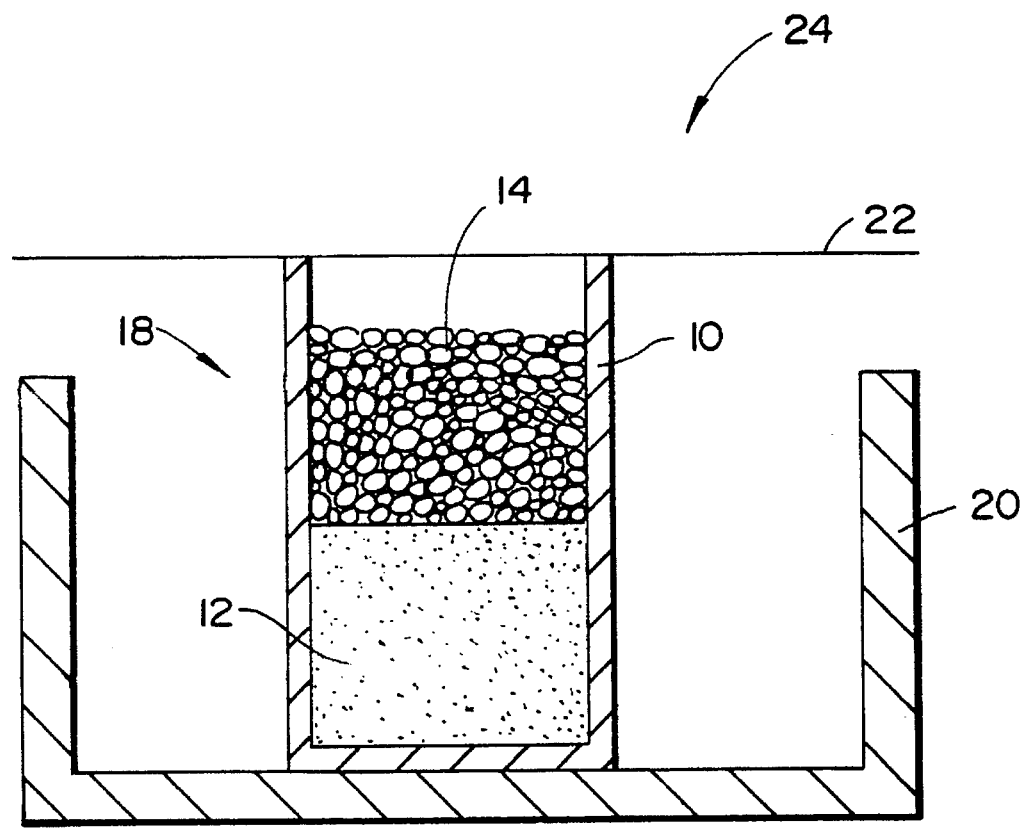
FIG. 4 is a cross-sectional schematic view of the setup used in carrying out the composite fabrication process of Example 3.

This Example demonstrates the fabrication of composite bodies comprising titanium aluminide intermetallics by the reactive infiltration of a parent metal comprising titanium. The setup employed in fabricating these composite bodies is shown schematically in FIG. 4. This Example should not be construed as being limited to the above-described embodiment, however, but instead as also disclosing other important aspects of the claimed invention.

SAMPLE A

This experiment specifically demonstrates the reactive infiltration of a parent metal comprising titanium into a permeable mass comprising titanium and aluminum nitride to form a composite body comprising a titanium aluminide intermetallic.

About 5.8 grams of titanium particulate having substantially all particles smaller than about 45 μm in diameter –325 mesh, Consolidated Astronautics Co., Saddle Brook, N.J. and about 4.2 grams of Grade A-200 aluminum nitride particulate (Advanced Refractory Technologies, Inc., Buffalo, N.Y.) were mixed by hand in a weighing dish until a uniform hue was achieved. The particulate mixture was then loaded into a Grade ATJ graphite crucible 10 (Union Carbide Company, Carbon Products Division, Cleveland, Ohio) having an inside diameter of about 1.25 inches (32 mm) and a height of about 2.5 inches (64 mm). The graphite crucible 10 and its contents were then hand tapped several times to collapse any excessive void space between the particles, thereby forming the particulate mixture into a permeable mass 12. A parent metal 14 comprising titanium sponge having substantially all granule sizes between about 850 and 4000 μm (–5 +20 mesh, Micron Metals, Inc., Salt Lake City, Utah) was poured into the graphite crucible 10 on top of the permeable mass 12 to form the Sample A lay-up 18.

SAMPLE B

This experiment specifically demonstrates the reactive infiltration of a parent metal comprising titanium into a permeable mass comprising titanium diboride and aluminum nitride to form a composite body comprising a titanium aluminide intermetallic.

About 8.5 grams of Grade A-200 aluminum nitride particulate (Advanced Refractory Technologies, Inc.) and about 11.6 grams of titanium diboride particulate (1–5 micron average particle diameter, Atlantic Equipment Engineers, Bergenfield, N.J.) were hand mixed in a weighing dish until a uniform hue was achieved. The particulate admixture was then poured into a Grade ATJ graphite crucible 10 having an inside diameter of about 1.5 inches (37 mm) and a height of about 2.5 inches (64 mm). The particulate admixture was leveled and the crucible was tapped by hand several times to collapse any excessive void space between the particles, thereby forming the particulate admixture into a permeable mass 12. About 39.2 grams of a parent metal 14 comprising titanium sponge having substantially all granule sizes between about 300 and about 700 microns in diameter (Micron Metals, Inc.) was then poured into the graphite crucible 10 and spread evenly over the surface of the permeable mass 12 to complete the Sample B lay-up 18.

The lay-ups 18 for Samples A and B were then placed into a graphite containment boat 20 measuring about 10 inches (254 mm) square by about 4 inches (102 mm) in height. The opening at the top of the boat was covered with a GRAFOIL® graphite foil sheet 22 (Union Carbide Co.) to complete the setup 24. The setup 24 comprising the graphite containment boat 20 and its contents was then placed into the vacuum chamber of a vacuum furnace at a temperature of about 25° C. The chamber was sealed, and then twice evacuated to about $2\times10^{-4}$ torr and backfilled with commercially pure argon gas to about atmospheric pressure. An argon gas flow rate through the vacuum chamber of about 2000 sccm at a pressure above atmospheric pressure of about 5 psi (35,000 Pa) was thereafter established and maintained. The temperature in the vacuum chamber was then increased from about 25° C. to a temperature of about 1700° C. at a rate of about 300° C. per hour. After maintaining a temperature of about 1700° C. for about 10 hours, the temperature was then decreased back to about 25° C. at a rate of about 200° C. per hour. After the temperature in the vacuum chamber had decreased to about 25° C., the pressure in the chamber was equilibrated with ambient atmospheric pressure, the chamber was opened and the setup 24 comprising the graphite containment boat 20 and its contents was removed from the vacuum chamber and disassembled. For each of Samples A and B, a composite body had been formed as the permeable mass of particulate matter in each graphite crucible appeared to have been completely infiltrated.

Each composite body was sectioned with a diamond saw, mounted in plastic and polished with progressively finer grades of diamond polishing compound in preparation for microscopic examination. Furthermore, each composite body was analyzed qualitatively using x-ray diffraction substantially as described in Example 1.

Figure 5:
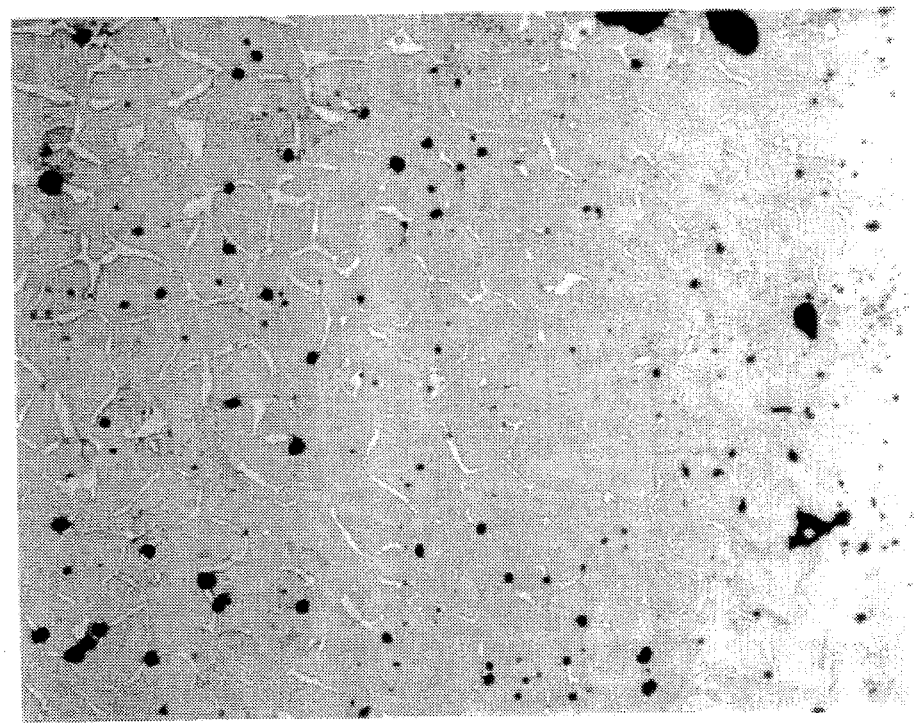
FIG. 5 is an optical photomicrograph taken at about magnification of a polished cross-section of the Sample A composite material of Example 3.
Figure 6A:
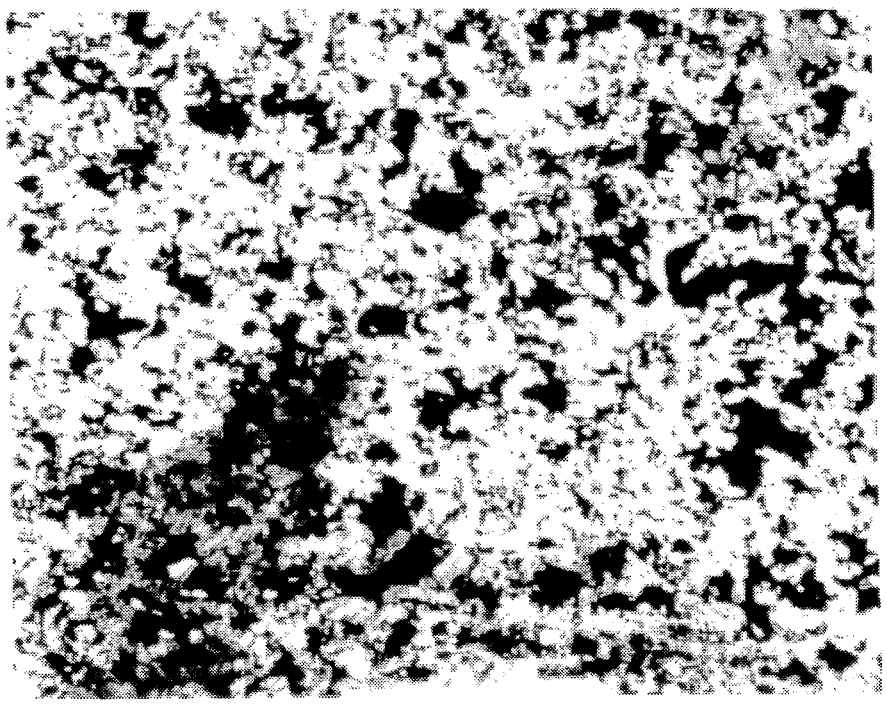
FIGS. 6A and 6B are optical photomicrographs taken at about 53× and about 425× magnifications, respectively, of a polished cross-section of the Sample B composite material of Example 3.
Figure 6B:
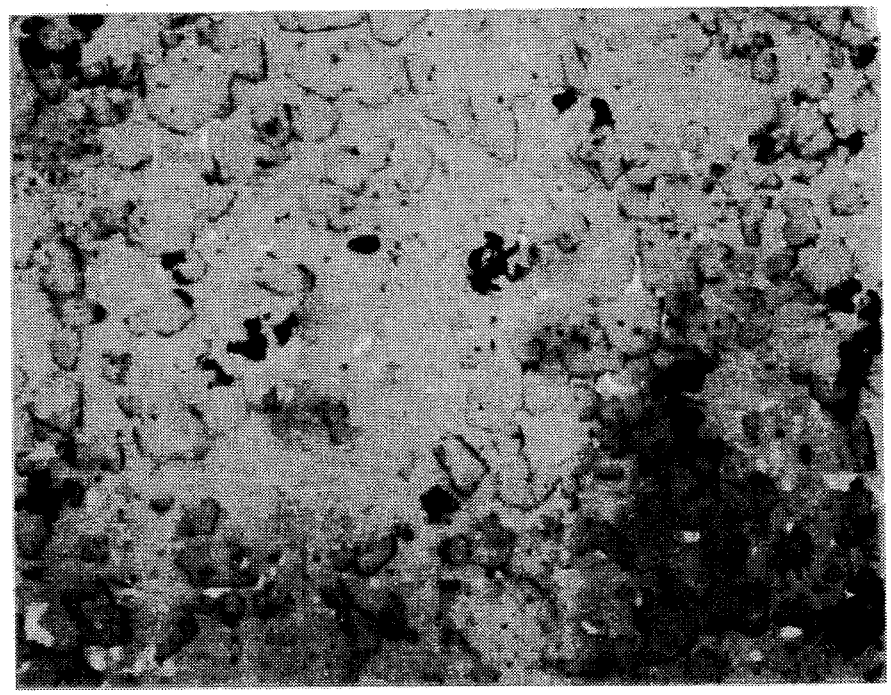

FIG. 5 is an approximately 53× magnification optical photomicrograph of a polished cross-section of the Sample A composite material. FIGS. 6A and 6B are approximately 53× and 425× magnification, respectively, optical photomicrographs of a polished cross-section of the Sample B composite material.

The x-ray diffraction analysis of the Sample A composite material revealed the presence of TiC, TiN and $Ti_9Al_{23}$ phases. The x-ray diffraction analysis of the Sample B composite material revealed the presence of TiC, TiN, $TiB_2$, $TiAl_3$ phases and possibly some residual Al.

Thus, this Example demonstrates that a composite body comprising $Ti_9Al_{23}$ or $TiAl_3$ titanium aluminide intermetallics may be formed by the reactive infiltration of a molten parent metal comprising titanium into a permeable mass comprising aluminum nitride.

EXAMPLE 4

This Example demonstrates the fabrication of composite bodies comprising $MoSi_2$ molybdenum disilicide intermetallic. The setup employed was substantially the same as that shown in FIG. 1. This Example should not be construed as being limited to the above-described embodiment, however, but instead as also disclosing other important aspects of the claimed invention.

SAMPLE C–E

A lay-up for fabricating a composite body by the methods of the present Example was prepared as follows:

Molybdenum dioxide and alumina particulates were roll mixed for about 1 hour in the absence of milling or grinding media. The roll mixed particulate admixture was then placed into an approximately 2 inch (51 mm) square box constructed from GRAFOIL® graphite foil sheet material (Union Carbide Co., Carbon Products Division, Cleveland, Ohio) and leveled. The GRAFOIL® graphite foil box and its contents were than hand tapped several times to consolidate the particulates contained within and thereby collapsing any excessive void space between the particles. The graphite foil box was constructed from a single sheet of GRAFOIL® graphite foil material measuring about 0.015 inches (0.4 mm) thick by making strategically placed cuts and folds in the sheet material and stapling the seams to form a five-sided box. An ingot of a parent metal comprising by weight about 30% silicon, 5% magnesium and the balance aluminum was then placed into the graphite foil box on top of the particulate admixture. At the interface between the ingot of parent metal and the admixture of molybdenum dioxide and alumina particulates was sprinkled a uniform layer of initiator material comprising magnesium particulate wherein substantially all of the magnesium particles were between about 300 μm and 700 μm in diameter (−24, +50 mesh, Hart Corporation, Tamaqua, Pa.).

Table 1 reports the specific quantities of the above-mentioned materials employed in fabricating the lay-up for each of Samples C–E.

TABLE 1

| Sample | Permeable Mass | Initiator wt (g) | Parent Metal wt (g) | Preform wt (g) |
|---|---|---|---|---|
| C | 100 g $MoO_2$[a], 100 g $Al_2O_3$[b] | 0.41 | 151 | 76 |
| D | 25 g $MoO_2$[a], 75 g $Al_2O_3$[b] | 0.78 | 204 | 84 |
| E | 10.1 g $MoO_2$[a], 90.1 g $Al_2O_3$[b] | 0.88 | 201 | 86 |

[a]Alfa Products, Div. of Johnson Matthey Co., Ward Hill, MA, 99% pure
[b]EGPA alumina, 15 μm average particle size, Norton Co., Worcester, MA The lay-ups of Samples C, D and E were then placed into a graphite containment boat 20 measuring about 10 inches (254 mm) square by about 4 inches (102 mm) in height. The opening at the top of the boat 20 was covered with a GRAFOIL® graphite foil sheet 22 (Union Carbide Co.) to complete the setup 24.

The setup 24 comprising the graphite containment boat 20 and its contents was then placed into the vacuum chamber of a vacuum furnace at a temperature of about 150° C. The vacuum chamber was sealed and the contents of the vacuum chamber were twice evacuated to less than about 30 inches (760 mm) of mercury vacuum and backfilled with commercially pure nitrogen gas to about atmospheric pressure. After the second backfill, a nitrogen gas flow rate of about 4000 sccm was established and maintained in the vacuum chamber at a pressure above atmospheric pressure of about 5 psi (35,000 Pa).

The temperature of the vacuum chamber and its contents was then increased from about 150° C. to a temperature of about 925° C. at a rate of about 200° C. per hour. After maintaining a temperature of about 925° C. for about 10 hours, the temperature of the vacuum chamber and its contents was then decreased to a temperature of about 825° C. at a rate of about 400° C. per hour. At a temperature of about 825° C., the pressure of the vacuum chamber was brought back to about ambient atmospheric pressure, the vacuum chamber was opened and the setup comprising the graphite containment boat and its contents was removed from the vacuum chamber and allowed to cool naturally in air back to a temperature of about 20° C.

Once the setup had cooled substantially to about 20° C., the various lay-ups contained in the setup were disassembled. Specifically, disassembly of the Samples C and D lay-ups revealed that the permeable mass comprising the particulate admixture of molybdenum dioxide and aluminum oxide had been infiltrated to a depth of a few millimeters. Disassembly of the Sample E lay-up revealed that the permeable mass comprising this particulate admixture had been completely infiltrated. Each composite body was x-ray diffraction analyzed substantially in accordance with the procedure of Example 1. Furthermore, each composite body was sectioned with a diamond saw, mounted in plastic and polished with progressively finer grades of diamond polishing compound in preparation for microscopic examination.

Figure 7A:
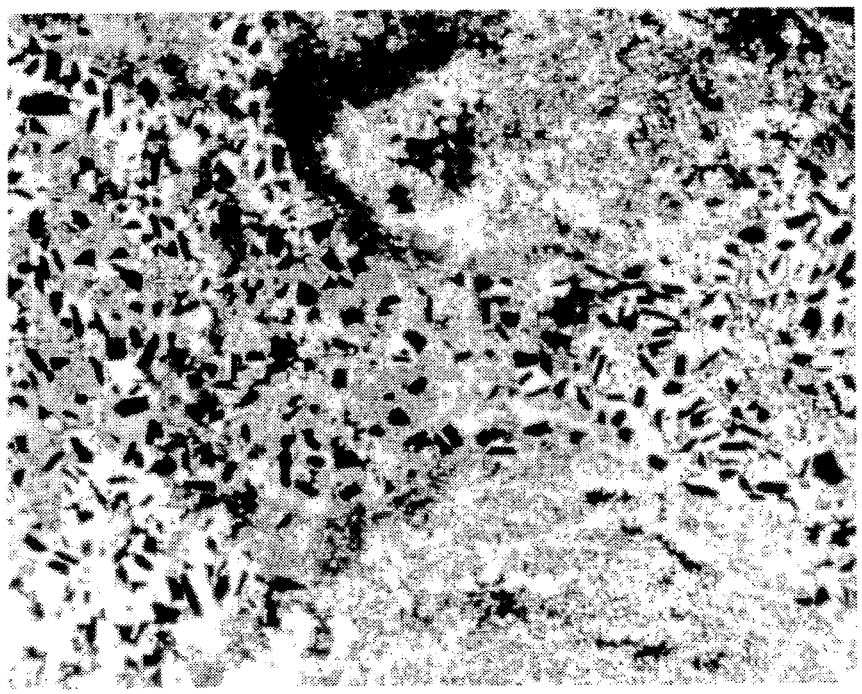
FIGS. 7A and 7B are optical photomicrographs taken at about 53× and about 425× magnifications, respectively, of a polished cross-section of the Sample C composite material.
Figure 7B:
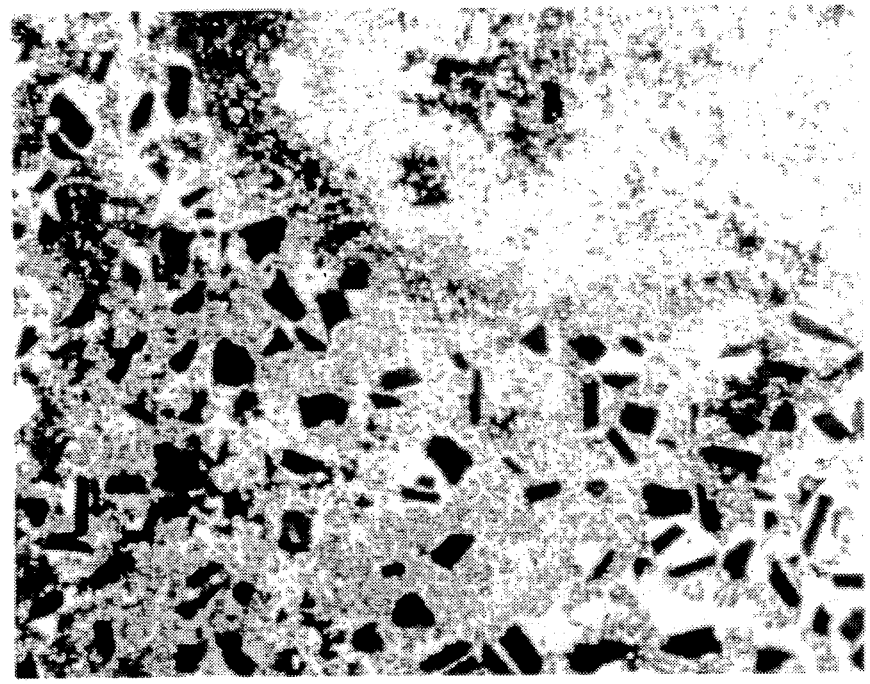

The x-ray diffraction analysis of the formed Sample C composite material revealed the presence of the following phases in the formed composite material: Al, Si, $MoSi_2$, $\alpha$-$Al_2O_3$, $MgAl_2O_4$ and Mo. FIGS. 7A and 7B are optical photomicrographs taken at about 53× and about 425× magnifications, respectively, of polished cross-section of the Sample C composite material.

Figure 8A:
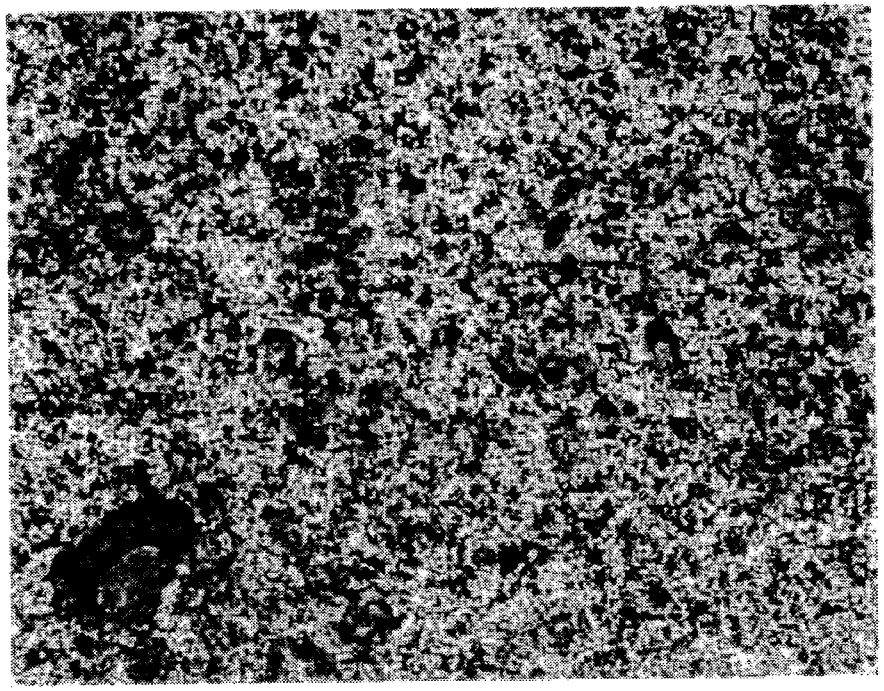
FIGS. 8A and 8B are optical photomicrographs taken at about 53× and about 380× magnifications, respectively, of a polished cross-section of the Sample D composite material.
Figure 8B:

The x-ray diffraction analysis of the formed Sample D composite material revealed the presence of the following phases: Al, Si, $MoSi_2$ and $\alpha$-$Al_2O_3$. FIGS. 8A and 8B are optical photomicrographs taken at about 53× and about 380× magnifications, respectively, of a polished cross-section of the Sample D composite material.

Figure 9A:
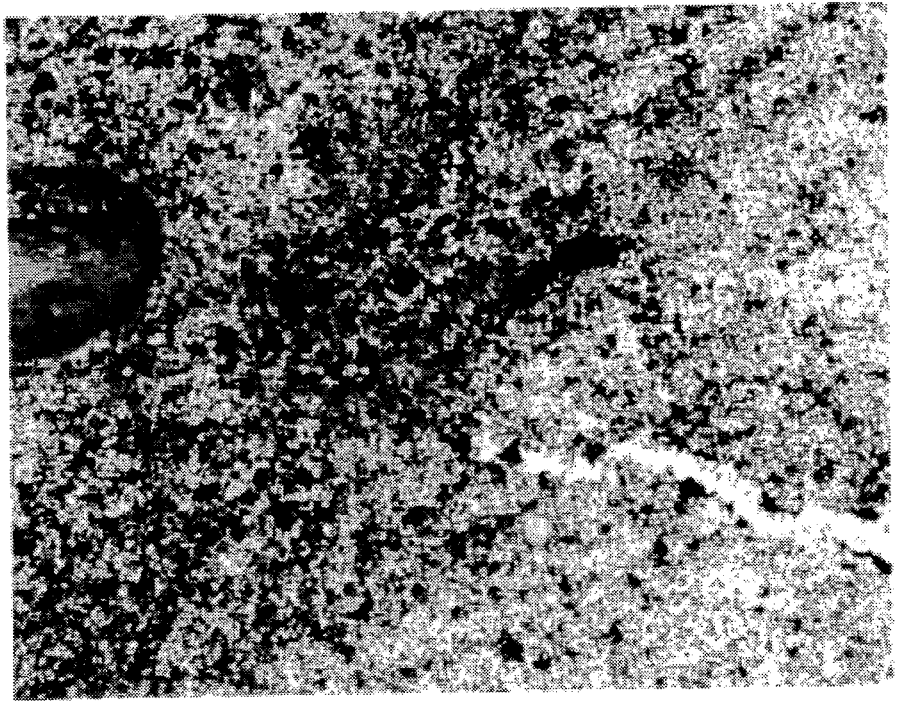
FIGS. 9A and 9B are optical photomicrographs taken at about 53× and about 425× magnifications, respectively, of a polished cross-section of the Sample E composite material.
Figure 9B:
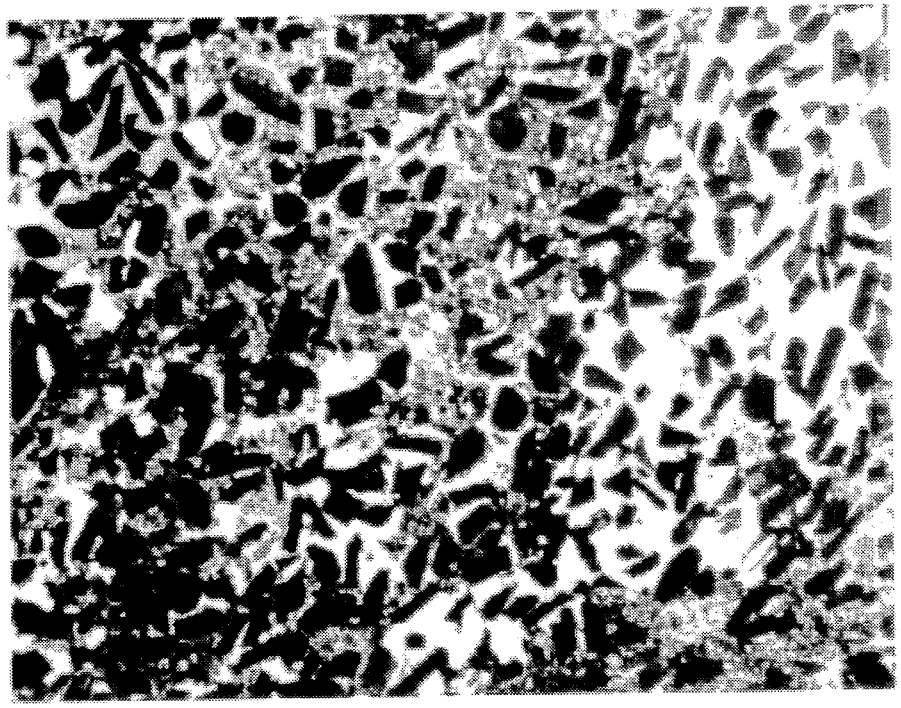

The x-ray diffraction analysis of the formed Sample E composite material revealed the presence of the following phases in the formed composite material: Al, Si, $MoSi_2$, $\alpha$-$Al_2O_3$ and AlN. FIGS. 9A and 9B are optical photomicrographs taken at about 53× and about 425× magnifications, respectively, of a polished cross-section of the Sample E composite material.

Thus, this Example demonstrates that a composite body comprising an oxidation reaction product comprising $MoSi_2$ molybdenum disilicide intermetallic can be formed by reactively infiltrating a parent metal comprising silicon into a permeable mass comprising molybdenum dioxide and alumina.

EXAMPLE 5

This Example demonstrates the fabrication of a composite body comprising an oxidation reaction product comprising $MoSi_2$ molybdenum disilicide intermetallic. The setup employed in fabricating the composite bodies of this Example was substantially the same as that shown in FIG. 4. This Example should not be construed as being limited to the above-described embodiment, however, but instead as also disclosing other important aspects of the claimed invention.

SAMPLES F–J

The lay-ups for Samples F–J were fabricated in substantially the same manner with the exception that the parent metal for Samples I and J comprised a hand-mixed admixture of ALFA® silicon (Alfa Products, Division of Johnson-Matthey Co., Ward Hill, Mass., 99.999pure) and AESAR® aluminum (Aesar Group of Johnson-Matthey Co., Seabrook, N.H., 99.9% pure) granules.

Table 2 contains a list of the particular amounts of the various raw materials used in assembling each lay-up.

TABLE 2

| Sample | Wt. Mo[1] | Wt. SiC[2] | Parent Metal | Wt. Parent Metal |
|---|---|---|---|---|
| F | 26.5 g | 26.5 g | Si[3], 5n pure | 100.7 g |
| G | 15 | 45.0 | Si, 5n pure | 100.4 |
| H | 5.1 | 45.6 | Si, 5n pure | 100.3 |
| I | 22.9 | 22.9 | Si[1]-20 wt % Al[4] | 125.5 |
| J | 4.9 | 44.5 | Si-20 wt % Al | 128.3 |

[1]Alfa Products, Division of Johnson Matthey Co., Ward Hill, MA
[2]Superstrong MCA, Norton Co., Worcester, MA, 500 grit
[3]Atlantic Equipment Engineers, Bergenfield, NJ, −325 mesh
[4]AESAR Group of Johnson Matthey Co., Seabrook, NH, 99.9% pure, 2–10 mm granules A master particulate admixture comprising by weight about 75 grams of ALFA® molybdenum particulate (Alfa Products, Division of Johnson Matthey Co., Ward Hill, Mass.) and about 75 grams of Superstrong NCA silicon carbide particulate ( Norton Company, Worcester, Mass.) was prepared by loading the particulates into a jar mill and roll mixing in the absence of grinding media for about 1 hour. For all except the Sample F experimental run, the composition of each permeable mass of filler was formulated by "diluting" down a particular quantity of the master blend with additional superstrong MCA silicon carbide particulate, specifically, by adding the desired quantity of silicon carbide to the desired quantity of the master blend and roll mixing for about 15 minutes in substantially the same manner as was used to mix the master blend.

The permeable mass comprising the particulate admixture of molybdenum and silicon carbide was then poured into a Grade ATJ graphite crucible (Union Carbide Company, Carbon Products Division, Cleveland, Ohio) measuring about 2 inches (51 mm) square by about 2.5 inches (64 mm) in height and leveled. The graphite crucible and its contents were then tapped by hand several times to consolidate the powder somewhat by collapsing any excessive pore space between the particles in the permeable mass. The desired quantity of parent metal particulate or granules were then poured on top of the permeable mass and leveled to complete the lay-up.

Each lay-up was then placed into the vacuum chamber of a vacuum furnace at a temperature of about 20° C. The vacuum chamber was sealed and the contents of the vacuum chamber were twice evacuated to about 2×10–4 torr and backfilled with commercially pure argon gas to about atmospheric pressure. After the second backfill, an argon gas flow through the vacuum chamber was established and maintained at a flow rate of about 1000sccm at a pressure above atmospheric pressure of about 5 psi (35,000 Pa).

The temperature of the vacuum chamber and its contents was then increased from a temperature of about 20° C. to a temperature of about 1700° C. at a rate of about 400° C. per hour. After maintaining a temperature of about 1700° C. for about 10 hours, the temperature of the vacuum chamber and its contents was then decreased to about 20° C. at a rate of about 400° C. per hour. When the temperature inside the vacuum chamber had cooled down to substantially ambient temperature (e.g., about 200° C.), the pressure in the vacuum chamber was equilibrated with the ambient atmospheric pressure, the furnace chamber was opened, and the lay-ups for Samples F–J were removed from the vacuum chamber and disassembled.

Disassembly of each lay-up revealed the formation of a composite body. Specifically, it appeared that each permeable mass had been substantially completely infiltrated. Each composite body was sectioned with a diamond saw, mounted in plastic and polished with progressively finer grades of diamond polishing compound in preparation for microscopic examination. Each formed composite body was also analyzed qualitatively using x-ray diffraction substantially in accordance with Example 1.

Figure 10A:
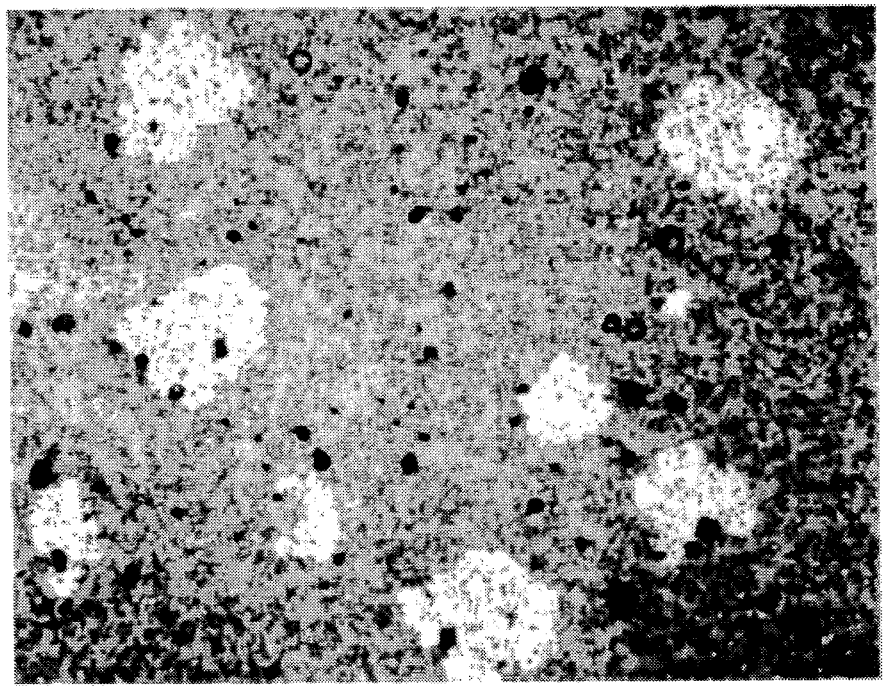
FIG. 10A is a scanning electron photomicrograph taken using backscattered electron imaging at about 50× magnification of a polished cross-section of the Sample F composite material.
Figure 10B:
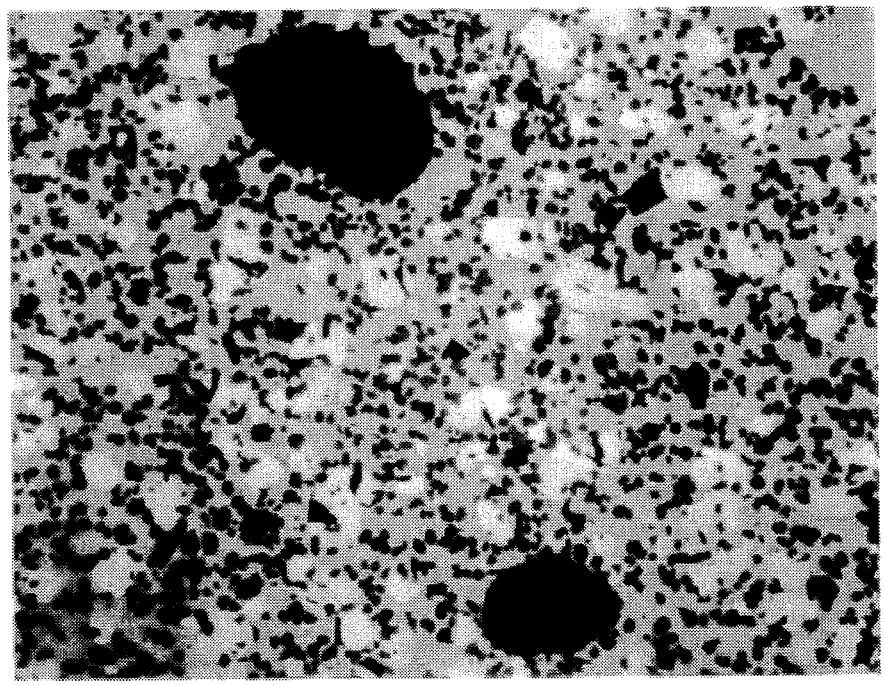
FIG. 10B is an optical photomicrograph taken at about 106× magnification of a polished cross-section of the Sample F composite material.

FIGS. 10A and 10B are a scanning electron photomicrograph using backscattered electron imaging and an optical photomicrograph taken at about 50× and about 106× magnification, respectively, of a polished cross section of the Sample F composite material.

Figure 11:
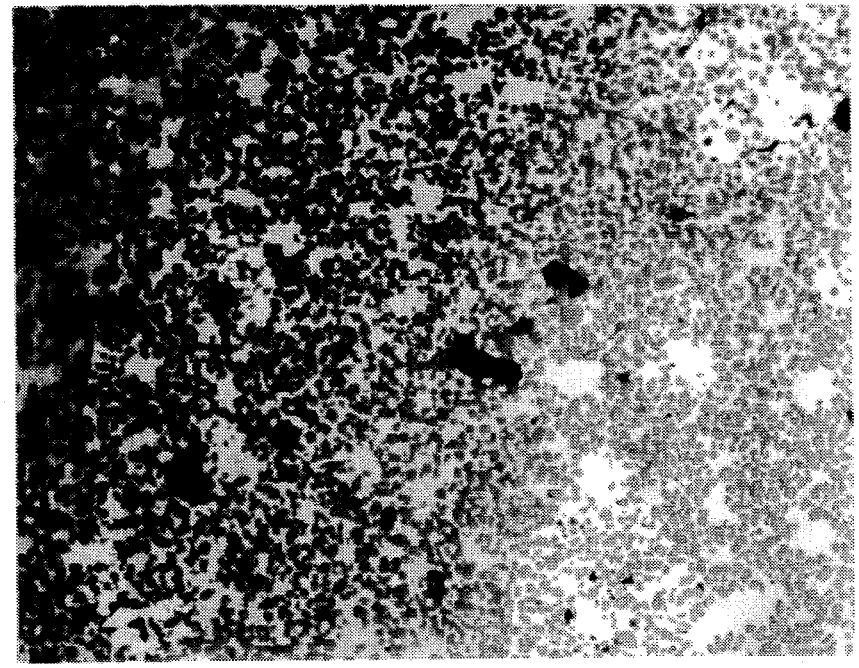
FIG. 11 is an optical photomicrograph taken at about 106× magnification of a polished cross-section of the Sample G composite material.

FIG. 11 is an optical photomicrograph taken at about 106× magnification of a polished cross section of the Sample G composite material.

Figure 12:
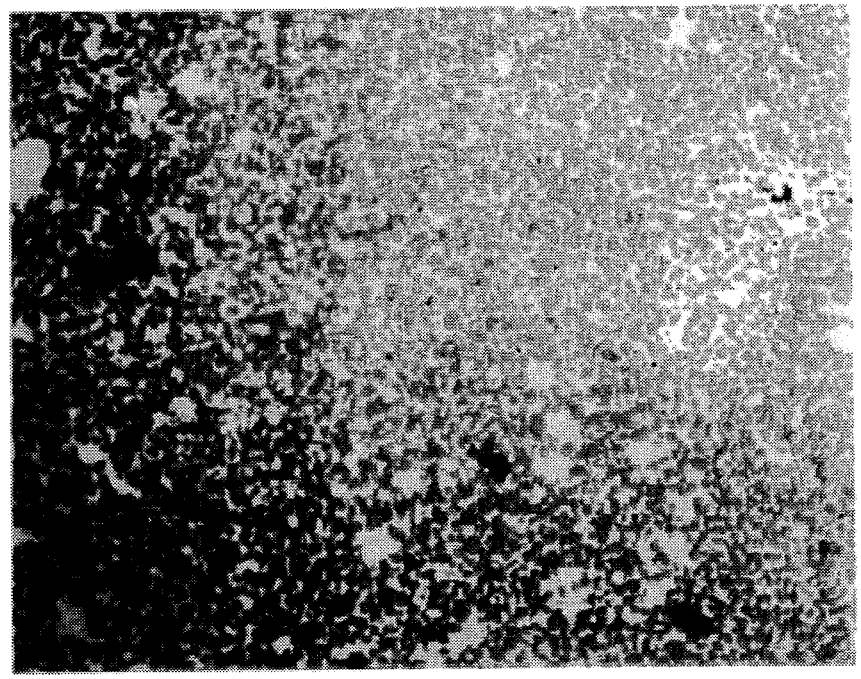
FIG. 12 is an optical photomicrograph taken at about 106× magnification of a polished cross-section of the Sample H composite material.

FIG. 12 is an optical photomicrograph taken at about 106× magnification of a polished cross section of the Sample H composite material.

Figure 13A:
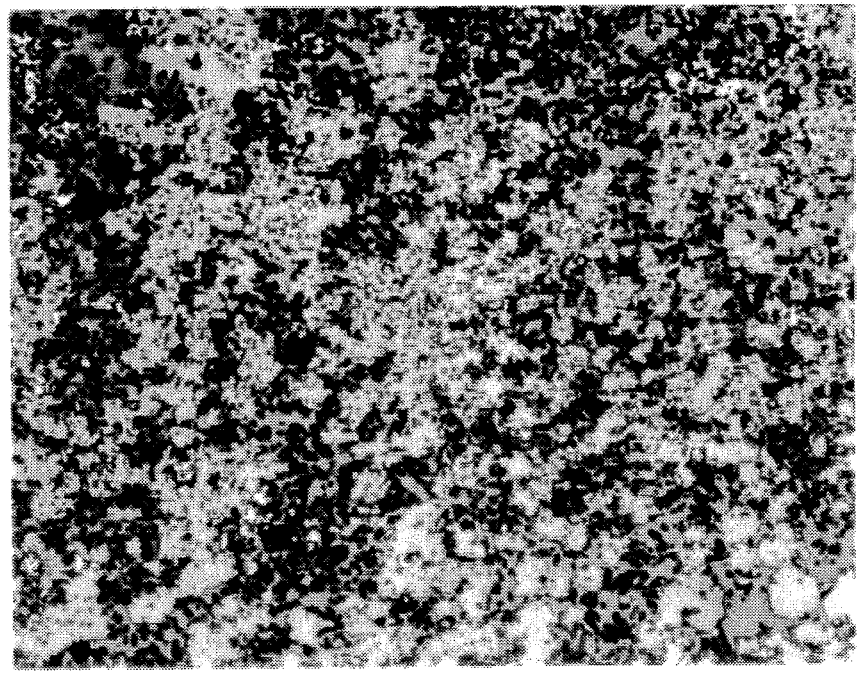
FIGS. 13A and 13B are optical photomicrographs taken at about 53× and 425× magnification, respectively, of a polished cross-section of the Sample I composite material.
Figure 13B:
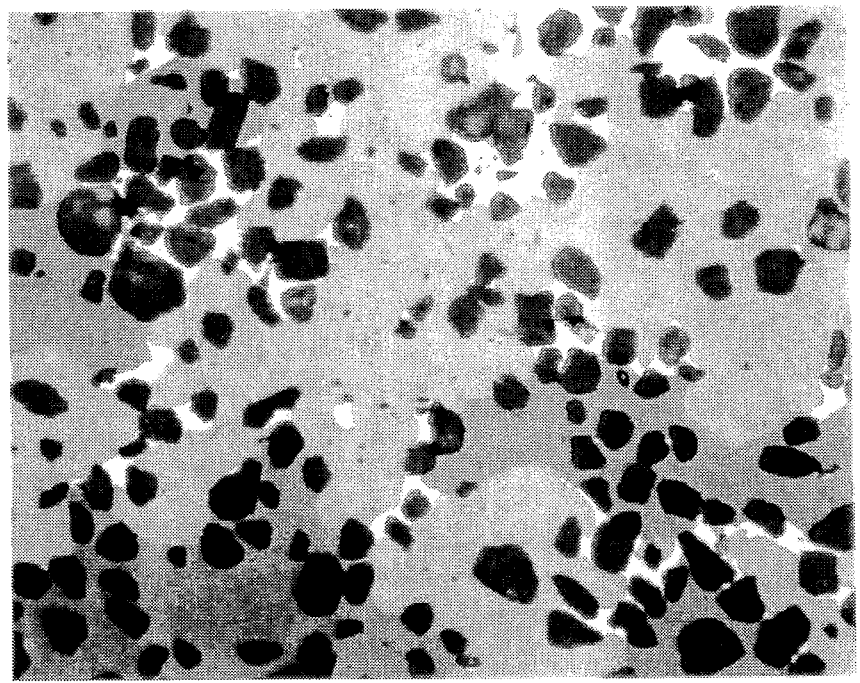

FIGS. 13A and 13B are optical photomicrographs taken at about 53× and 425× magnification, respectively, of a polished cross section of the Sample I composite material.

Figure 14:
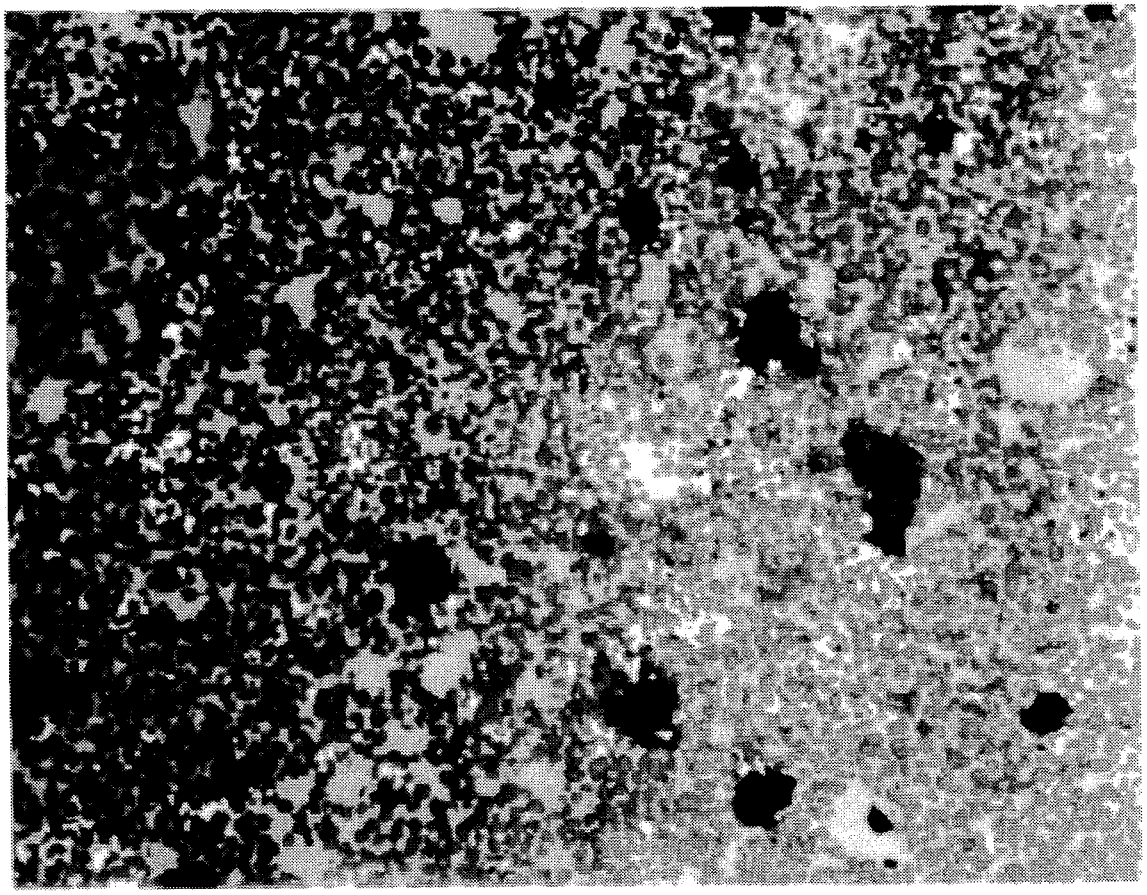
FIG. 14 is an optical photomicrograph taken at about 106× magnification of a polished cross-section of the Sample J composite material.

FIG. 14 is an optical photomicrograph taken at about 106× magnification of a polished cross section of the Sample J composite material.

The qualitative X-ray diffraction analyses of the Sample F, G and H composite materials revealed the presence of the following phases in each composite body: Si, SiC and MoSi$_2$. Similar analyses of the Sample I and J composite materials additionally revealed the presence of an Al phase in the formed composite body.

Thus, this Example demonstrates that a composite body comprising an MoSi$_2$ molybdenum disilicide intermetallic oxidation reaction product can be formed by reactively infiltrating a parent metal comprising silicon or a silicon-aluminum alloy into a permeable mass comprising molybdenum.

We claim:
1. A method for producing a self-supporting body comprising infiltrating a permeable mass with an oxidation reaction product obtained by oxidation of a parent metal to form a polycrystalline material comprising (i) at least one oxidation reaction product of said parent metal with at least one solid-phase oxidant, and (ii) a metallic component comprising at least one metallic phase, said method comprising the steps of:

(a) forming a permeable mass comprising an oxidant consisting essentially of at least one solid-phase oxidant selected from the group consisting of the halogens, sulphur and its compounds, metals, metal oxides other than the silicates, and metal nitrides other than those of boron and silicon;

(b) orienting said permeable mass and a source of said parent metal relative to each other so that formation of said at least one oxidation reaction product will occur into said permeable mass;

(c) heating said source of parent metal to a temperature above the melting point of said parent metal but below the melting point of said at least one oxidation reaction product to form a body of molten parent metal;

(d) reacting said body of molten parent metal with said at least one solid-phase oxidant at said temperature to permit said at least one oxidation reaction product to form;

(e) maintaining at least a portion of said at least one oxidation reaction product in contact with and between said molten parent metal and said at least one solid-phase oxidant at said temperature to progressively draw molten parent metal through said at least one oxidation reaction product towards said at least one solid-phase oxidant to permit fresh oxidation reaction product to continue to form at an interface between said at least one solid-phase oxidant and previously formed oxidation reaction product that has infiltrated said permeable mass; and (f) continuing step (e) at said temperature for a time sufficient to infiltrate at least a portion of said permeable mass with said polycrystalline material, thereby forming said self-supporting body comprising (a) said at least one oxidation reaction product; and (b) a metallic component comprising at least one metallic phase.

2. The method of claim 1, wherein said permeable mass further comprises at least one second or foreign metal.

3. A method for producing a self-supporting composite body comprising infiltrating a permeable mass with a polycrystalline material comprising at least one oxidation reaction product, said method comprising the steps of:

(a) forming a permeable mass comprising at least one filler material and at least one solid-phase oxidant selected from the group consisting of the halogens, sulphur and its compounds, metals, metal oxides and metal nitrides other than boron nitride;

(b) orienting said permeable mass and a source of said parent metal relative to each other so that formation of said oxidation reaction product of said parent metal and said at least one solid-phase oxidant will occur into said permeable mass;

(c) heating said source of parent metal to a temperature above the melting point of said parent metal but below the melting point of said oxidation reaction product to form a body of molten parent metal;

(d) reacting said body of molten parent metal with an oxidant consisting essentially of said at least one solid-phase oxidant at said temperature to permit said at least one oxidation reaction product to form;

(e) maintaining at least a portion of said at least one oxidation reaction product in contact with and between said molten parent metal and said at least one solid-phase oxidant to progressively draw molten parent metal through said at least one oxidation reaction product toward said at least one solid-phase oxidant and towards and into the permeable mass of filler material to permit fresh oxidation reaction product to continue to form at an interface between said at least one solid-phase oxidant and previously formed oxidation reaction product that has infiltrated said permeable mass; and (f) continuing step (e) at said temperature for a time sufficient to infiltrate at least a portion of said permeable mass with said polycrystalline material, thereby forming said self-supporting composite body comprising said at least one oxidation reaction product and said at least one filler material embedded by said at least one oxidation reaction product.

4. The method of claim 3, wherein said at least one oxidation reaction product comprises at least one phase selected from the group consisting of art intermetallic phase and a ceramic phase.

5. The method of claim 3, wherein said polycrystalline material further comprises a metallic component comprising at least one metallic constituent.

6. The method of claim 5, wherein said at least one metallic constituent comprises at least one constituent selected from the group consisting of at least one residual unreacted constituent of said parent metal and at least one second or foreign metal.

7. The method of claim 3, wherein said parent metal comprises aluminum, said solid-phase oxidant comprises niobium and said oxidation reaction product comprises niobium aluminide (NbAl$_3$).

8. The method of claim 3, wherein said parent metal comprises aluminum, said solid-phase oxidant comprises titanium and said oxidation reaction product comprises titanium aluminide (TiAl$_3$).

9. The method of claim 3, wherein said parent metal comprises titanium, said solid-phase oxidant comprises aluminum nitride and said oxidation reaction product comprises at least one titanium aluminide intermetallic phase.

10. The method of claim 3, wherein said parent metal comprises silicon, said solid-phase oxidant comprises molybdenum and said oxidation reaction product comprises molybdenum disilicide.

11. The method of claim 3, wherein said filler material comprises at least one material selected from the group consisting of silicon carbide and titanium diboride.

12. The method of claim 1, wherein said parent metal comprises at least one metal selected from the group consisting of aluminum, silicon, titanium, zirconium, hafnium, tin and zinc.

13. The method of claim 1, wherein said solid-phase oxidant comprises at least one material selected from the group consisting of arsenic, selenium, tellurium, molybdenum, niobium, titanium and silicon.

14. The method of claim 1, wherein said at least one metallic phase comprises at least one intermetallic phase.

15. The method of claim 1, wherein said permeable mass further comprises at least one filler material.

16. The method of claim 1, wherein said metal oxides comprise at least one oxide selected from the group consisting of the oxides of chromium, molybdenum, niobium and silicon.

17. The method of claim 3, wherein said metal nitrides comprise a nitride of at least one metal selected from the group consisting of aluminum and silicon.

18. The method of claim 3, wherein said at least one oxidation reaction product comprises at least two oxidation reaction products comprising at least one intermetallic phase and at least one ceramic phase.

19. The method of claim 6, wherein said at least one second or foreign metal comprises a metal reduced from said at least one solid-phase oxidant.

20. A method for producing a self-supporting composite body comprising infiltrating a permeable mass with a polycrystalline material comprising at least one oxidation reaction product comprising an intermetallic material, said method comprising the steps of:

(a) forming a permeable mass comprising at least one solid-phase oxidant selected from the group consisting of borides, carbides, nitrides, oxides and metals;

(b) orienting said permeable mass and a source of a parent metal relative to each other so that formation of said at least one oxidation reaction product of said parent metal and said at least one solid-phase oxidant will occur into said permeable mass;

(c) heating said source of parent metal to a temperature above the melting point of said parent metal but below the melting point of said oxidation reaction product to form a body of molten parent metal;

(d) reacting said body of molten parent metal with an oxidant consisting essentially of said at least one solid-phase oxidant at said temperature to permit said at least one oxidation reaction product comprising said intermetallic material to form;

(e) maintaining at least a portion of said at least one oxidation reaction product in contact with and between said molten parent metal and said at least one solid-phase oxidant to progressively draw molten parent metal through said at least one oxidation reaction product toward said at least one solid-phase oxidant and towards and into the mass of filler material to permit fresh oxidation reaction product to continue to form at an interface between said at least one solid-phase oxidant and previously formed oxidation reaction product that has infiltrated said permeable mass; and (f) continuing step (e) at said temperature for a time sufficient to infiltrate at least a portion of said permeable mass with said polycrystalline material, thereby forming said self-supporting composite body comprising said at least one oxidation reaction product comprising said intermetallic material.

21. The method of claim 20, wherein said intermetallic material comprises at least one member selected from the group consisting of a metal silicide and a metal aluminide.

* * * * *